US008799757B2

(12) United States Patent
Jewsbury et al.

(10) Patent No.: US 8,799,757 B2
(45) Date of Patent: Aug. 5, 2014

(54) SYNCHRONIZATION ASPECTS OF INTERACTIVE MULTIMEDIA PRESENTATION MANAGEMENT

(75) Inventors: Andrew William Jewsbury, Seattle, WA (US); James C. Finger, Kirkland, WA (US); Olivier Colle, Redmond, WA (US); Robert K. Hughes, Jr., Kirkland, WA (US); Sean Hayes, Bristol (GB); See-Mong Tan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 677 days.

(21) Appl. No.: 11/355,209

(22) Filed: Feb. 15, 2006

(65) Prior Publication Data

US 2007/0006063 A1 Jan. 4, 2007

Related U.S. Application Data

(60) Provisional application No. 60/695,944, filed on Jul. 1, 2005.

(51) Int. Cl.
*G06F 17/00* (2006.01)
*G06F 17/30* (2006.01)
*G11B 27/10* (2006.01)

(52) U.S. Cl.
CPC .... *G06F 17/30017* (2013.01); *G06F 17/30058* (2013.01); *G11B 27/10* (2013.01)
USPC ............................ 715/203; 715/201; 715/200

(58) Field of Classification Search
CPC .................... G06F 17/30017; G06F 17/30058; G11B 27/10
USPC ...................... 715/500.1, 255, 255 I, 200–203
See application file for complete search history.

(56) References Cited

U.S. PATENT DOCUMENTS 5,195,092 A    3/1993    Wilson et al.
5,208,745 A    5/1993    Quentin et al.
(Continued)

FOREIGN PATENT DOCUMENTS

CA     2340144 A1    9/2001
EP     1345119 A    9/2003
(Continued)

OTHER PUBLICATIONS

Evans, Mark, "Lambda the Ultimate" Sep. 7, 2003, DP-COOL 2003 Proceedings, lambda-the-ultimate.org/classic/message8639.html.*

(Continued)

*Primary Examiner* — Cesar Paula
*Assistant Examiner* — David Faber
(74) *Attorney, Agent, or Firm* — Aaron Chatterjee; Andrew Sanders; Micky Minhas

(57) ABSTRACT

An interactive multimedia presentation has a predetermined presentation play duration, a video content component (which may include video, audio, data, or any combination thereof), and an interactive content component. Methods and systems for playing the presentation include specifying a time when a particular media object is renderable. The time is specifiable using an application instruction that references either a first timing signal having a rate that is based on the play speed of the presentation, or a second timing signal having a continuous rate. One example of an application instruction usable as described above is an element associated with an XML data structure. An attribute of the element, such as the clock attribute, may be used to provide time values for the element that reference either timing signal. The attribute is used to maintain frame-accurate synchronization between the video and the interactive content components of the presentation.

12 Claims, 9 Drawing Sheets

(56) References Cited

U.S. PATENT DOCUMENTS

| | | | |
|---|---|---|---|
| 5,394,547 A | 2/1995 | Correnti et al. | |
| 5,452,435 A | 9/1995 | Malouf et al. | |
| 5,515,490 A | 5/1996 | Buchanan et al. | |
| 5,608,859 A * | 3/1997 | Taguchi | 715/204 |
| 5,631,694 A | 5/1997 | Aggarwal et al. | |
| 5,659,539 A | 8/1997 | Porter et al. | |
| 5,694,560 A | 12/1997 | Uya et al. | |
| 5,717,468 A * | 2/1998 | Baryla | 725/37 |
| 5,758,008 A | 5/1998 | Tozaki et al. | |
| 5,760,780 A | 6/1998 | Larson et al. | |
| 5,794,018 A | 8/1998 | Vrvilo et al. | |
| 5,809,512 A | 9/1998 | Kato | |
| 5,877,763 A | 3/1999 | Berry | |
| 5,949,410 A | 9/1999 | Fung | |
| 5,966,121 A | 10/1999 | Hubbell et al. | |
| 5,995,095 A * | 11/1999 | Ratakonda | 715/255 |
| 6,067,638 A | 5/2000 | Benitz et al. | |
| 6,069,633 A | 5/2000 | Apparao et al. | |
| 6,100,881 A | 8/2000 | Gibbons et al. | |
| 6,122,433 A * | 9/2000 | McLaren | 386/68 |
| 6,212,595 B1 | 4/2001 | Mendel | |
| 6,369,830 B1 | 4/2002 | Brunner et al. | |
| 6,384,846 B1 | 5/2002 | Hiroi | |
| 6,385,596 B1 | 5/2002 | Wiser et al. | |
| 6,414,686 B1 | 7/2002 | Protheroe et al. | |
| 6,426,778 B1 | 7/2002 | Valdez, Jr. | |
| 6,430,570 B1 | 8/2002 | Judge et al. | |
| 6,442,658 B1 | 8/2002 | Hunt et al. | |
| 6,453,459 B1 | 9/2002 | Brodersen et al. | |
| 6,466,733 B1 * | 10/2002 | Kim | 386/263 |
| 6,505,153 B1 | 1/2003 | Van Thong et al. | |
| 6,564,382 B2 | 5/2003 | Duquesnoois et al. | |
| 6,565,153 B2 | 5/2003 | Hensel et al. | |
| 6,577,341 B1 | 6/2003 | Yamada et al. | |
| 6,628,283 B1 | 9/2003 | Gardner | |
| 6,629,150 B1 | 9/2003 | Huded | |
| 6,642,939 B1 | 11/2003 | Vallone et al. | |
| 6,665,835 B1 | 12/2003 | Gutfreund et al. | |
| 6,700,588 B1 | 3/2004 | MacInnis et al. | |
| 6,715,126 B1 | 3/2004 | Chang et al. | |
| 6,785,729 B1 | 8/2004 | Overby et al. | |
| 6,892,351 B2 * | 5/2005 | Vasudevan et al. | 715/716 |
| 6,906,643 B2 | 6/2005 | Samadani et al. | |
| 6,920,613 B2 | 7/2005 | Dorsey et al. | |
| 6,925,499 B1 | 8/2005 | Chen et al. | |
| 7,120,859 B2 * | 10/2006 | Wettach | 715/202 |
| 7,131,143 B1 | 10/2006 | LaMacchia et al. | |
| 7,200,357 B2 | 4/2007 | Janik et al. | |
| 7,210,037 B2 | 4/2007 | Samar | |
| 7,222,237 B2 | 5/2007 | Wuidart et al. | |
| 7,290,263 B1 | 10/2007 | Yip et al. | |
| 7,437,659 B2 | 10/2008 | Taniwaki et al. | |
| 7,480,446 B2 * | 1/2009 | Bhadkamkar et al. | 386/239 |
| 7,496,845 B2 | 2/2009 | Deutscher et al. | |
| 7,500,175 B2 | 3/2009 | Colle et al. | |
| 7,634,739 B2 * | 12/2009 | McCrossan et al. | 715/810 |
| 7,721,308 B2 | 5/2010 | Finger et al. | |
| 7,729,598 B2 * | 6/2010 | Ikeda et al. | 386/230 |
| 7,861,150 B2 * | 12/2010 | Colle et al. | 715/203 |
| 8,238,722 B2 * | 8/2012 | Bhadkamkar et al. | 386/285 |
| 2001/0005208 A1 * | 6/2001 | Minami et al. | 345/474 |
| 2001/0054180 A1 * | 12/2001 | Atkinson | 725/32 |
| 2001/0056504 A1 | 12/2001 | Kuznetsov | |
| 2001/0056580 A1 | 12/2001 | Seo et al. | |
| 2002/0038257 A1 * | 3/2002 | Joseph et al. | 705/26 |
| 2002/0091837 A1 | 7/2002 | Baumeister et al. | |
| 2002/0099738 A1 | 7/2002 | Grant | |
| 2002/0099952 A1 | 7/2002 | Lambert et al. | |
| 2002/0118220 A1 | 8/2002 | Lui et al. | |
| 2002/0138593 A1 | 9/2002 | Novak et al. | |
| 2002/0157103 A1 | 10/2002 | Song et al. | |
| 2002/0170005 A1 | 11/2002 | Hayes | |
| 2002/0188616 A1 | 12/2002 | Chinnici et al. | |
| 2003/0025599 A1 | 2/2003 | Monroe | |
| 2003/0026398 A1 | 2/2003 | Duran et al. | |
| 2003/0076328 A1 | 4/2003 | Beda et al. | |
| 2003/0078930 A1 | 4/2003 | Surcouf et al. | |
| 2003/0093792 A1 | 5/2003 | Labeeb et al. | |
| 2003/0142137 A1 | 7/2003 | Brown | |
| 2003/0152904 A1 | 8/2003 | Doty, Jr. | |
| 2003/0174160 A1 | 9/2003 | Deutscher et al. | |
| 2003/0182364 A1 | 9/2003 | Large et al. | |
| 2003/0182624 A1 | 9/2003 | Large | |
| 2003/0187801 A1 | 10/2003 | Chase | |
| 2003/0204511 A1 | 10/2003 | Brundage et al. | |
| 2003/0204613 A1 | 10/2003 | Hudson et al. | |
| 2003/0210270 A1 | 11/2003 | Clow | |
| 2003/0231863 A1 | 12/2003 | Eerenberg et al. | |
| 2004/0001706 A1 | 1/2004 | Jung et al. | |
| 2004/0027259 A1 | 2/2004 | Soliman et al. | |
| 2004/0034622 A1 | 2/2004 | Espinoza et al. | |
| 2004/0034795 A1 | 2/2004 | Anderson et al. | |
| 2004/0039834 A1 | 2/2004 | Saunders et al. | |
| 2004/0039909 A1 | 2/2004 | Cheng | |
| 2004/0049793 A1 | 3/2004 | Chou | |
| 2004/0068510 A1 | 4/2004 | Hayes et al. | |
| 2004/0107179 A1 | 6/2004 | Dalrymple, III | |
| 2004/0107401 A1 | 6/2004 | Sung et al. | |
| 2004/0111270 A1 | 6/2004 | Whitham | |
| 2004/0123316 A1 | 6/2004 | Kendall et al. | |
| 2004/0133292 A1 | 7/2004 | Sakurai et al. | |
| 2004/0143823 A1 | 7/2004 | Wei | |
| 2004/0148514 A1 | 7/2004 | Fee et al. | |
| 2004/0153648 A1 | 8/2004 | Rotholtz et al. | |
| 2004/0153847 A1 | 8/2004 | Apte et al. | |
| 2004/0156613 A1 | 8/2004 | Hempel et al. | |
| 2004/0187157 A1 | 9/2004 | Chong et al. | |
| 2004/0190779 A1 | 9/2004 | Sarachik et al. | |
| 2004/0205478 A1 * | 10/2004 | Lin et al. | 715/500.1 |
| 2004/0205479 A1 | 10/2004 | Seaman et al. | |
| 2004/0210824 A1 | 10/2004 | Shoff et al. | |
| 2004/0220926 A1 | 11/2004 | Lamkin et al. | |
| 2004/0221311 A1 | 11/2004 | Dow et al. | |
| 2004/0223740 A1 | 11/2004 | Itoi | |
| 2004/0228618 A1 | 11/2004 | Yoo et al. | |
| 2004/0243927 A1 | 12/2004 | Chung et al. | |
| 2004/0244003 A1 | 12/2004 | Perfetto et al. | |
| 2004/0247292 A1 | 12/2004 | Chung et al. | |
| 2004/0250200 A1 | 12/2004 | Chung et al. | |
| 2004/0267952 A1 * | 12/2004 | He et al. | 709/231 |
| 2004/0268224 A1 * | 12/2004 | Balkus et al. | 715/500.1 |
| 2005/0015815 A1 | 1/2005 | Shoff et al. | |
| 2005/0022116 A1 | 1/2005 | Bowman et al. | |
| 2005/0047754 A1 * | 3/2005 | Jung et al. | 386/95 |
| 2005/0088420 A1 | 4/2005 | Dodge et al. | |
| 2005/0091574 A1 * | 4/2005 | Maaniitty et al. | 715/500.1 |
| 2005/0114896 A1 | 5/2005 | Hug et al. | |
| 2005/0125741 A1 | 6/2005 | Clow et al. | |
| 2005/0132266 A1 | 6/2005 | Ambrosino et al. | |
| 2005/0140694 A1 | 6/2005 | Subramanian et al. | |
| 2005/0149729 A1 | 7/2005 | Zimmer et al. | |
| 2005/0183016 A1 | 8/2005 | Horiuchi et al. | |
| 2005/0190947 A1 | 9/2005 | Dulac | |
| 2005/0244146 A1 | 11/2005 | Tsumagari et al. | |
| 2005/0251732 A1 | 11/2005 | Lamkin et al. | |
| 2005/0289348 A1 | 12/2005 | Joy et al. | |
| 2006/0020950 A1 | 1/2006 | Ladd et al. | |
| 2006/0041522 A1 | 2/2006 | Rodriguez-Rivera | |
| 2006/0083486 A1 | 4/2006 | Kanemaru et al. | |
| 2006/0123451 A1 | 6/2006 | Preisman | |
| 2006/0136914 A1 | 6/2006 | Marascio et al. | |
| 2006/0140079 A1 | 6/2006 | Hamada et al. | |
| 2006/0269221 A1 | 11/2006 | Hashimoto et al. | |
| 2006/0274612 A1 | 12/2006 | Kim | |
| 2007/0002045 A1 | 1/2007 | Finger et al. | |
| 2007/0005757 A1 | 1/2007 | Finger et al. | |
| 2007/0005758 A1 | 1/2007 | Hughes, Jr. et al. | |
| 2007/0006061 A1 | 1/2007 | Colle et al. | |
| 2007/0006063 A1 | 1/2007 | Jewsbury et al. | |
| 2007/0006078 A1 | 1/2007 | Jewsbury et al. | |
| 2007/0006079 A1 | 1/2007 | Hayes et al. | |
| 2007/0006080 A1 | 1/2007 | Finger et al. | |
| 2007/0006233 A1 | 1/2007 | Finger et al. | |
| 2007/0006238 A1 | 1/2007 | Finger et al. | |

(56) References Cited

U.S. PATENT DOCUMENTS

| | | |
|---|---|---|
| 2007/0033419 A1 | 2/2007 | Kocher et al. |
| 2007/0122122 A1* | 5/2007 | Okamoto et al. ............. 386/109 |
| 2007/0174387 A1 | 7/2007 | Jania et al. |
| 2007/0198834 A1 | 8/2007 | Ksontini et al. |
| 2007/0277245 A1 | 11/2007 | Goto et al. |
| 2008/0126974 A1 | 5/2008 | Fawcett et al. |
| 2009/0007160 A1 | 1/2009 | Wei |
| 2011/0004943 A1 | 1/2011 | Chaganti et al. |

FOREIGN PATENT DOCUMENTS

| | | |
|---|---|---|
| EP | 1473618 | 11/2004 |
| EP | 1551027 A1 | 7/2005 |
| EP | 1641259 A1 | 3/2006 |
| GB | 2344925 A | 6/2000 |
| JP | 2000-098999 | 4/2000 |
| JP | 2001-022498 | 1/2001 |
| JP | 2003-284003 | 10/2003 |
| JP | 2004-007610 | 1/2004 |
| JP | 2004-086551 | 3/2004 |
| JP | 2004-221900 | 8/2004 |
| JP | 2005-149394 | 6/2005 |
| KR | 20030074093 | 9/2003 |
| WO | 0217179 A1 | 2/2002 |
| WO | 02091178 A | 11/2002 |
| WO | 02/103496 | 12/2002 |
| WO | 02103496 A2 | 12/2002 |
| WO | 03/062969 | 7/2003 |
| WO | 03077249 A1 | 9/2003 |
| WO | 2004025651 A1 | 3/2004 |
| WO | 2005002219 A1 | 1/2005 |
| WO | 2005/029842 | 3/2005 |
| WO | 2005020236 A1 | 3/2005 |
| WO | 2005029842 A1 | 3/2005 |
| WO | 2005048261 A1 | 5/2005 |
| WO | WO 2005048592 A1 * | 5/2005 ............. H04N 5/445 |
| WO | 2005052940 A1 | 6/2005 |
| WO | 2005/122530 | 12/2005 |
| WO | 2005122530 A1 | 12/2005 |

OTHER PUBLICATIONS

International Search Report dated Feb. 26, 2007 for Application No. PCT/US2006/024155, 8 pages.
Non Final Office Action for U.S. Appl. No. 11/405,736, dated May 18, 2009, 12 pages.
Cesar et al., "Open Graphical Framework for Interactive TV", IEEE Fifth International Symposium on Multimedia Software Engineering (ISMSE'03) p. 21, accessed at http://doi.ieeecomputersociety.org/10.1109/MMSE.2003.1254418 on Sep. 20, 2005.
Apple, Compressor 2 User Manual, Apr. 25, 2005, Apple, select pages (3 in total).
Apple, Final Cut Pro 5 User Manual, May 11, 2005, Apple, select pages (73 in total).
International Search Report for PCT/US06/23905 of Jun. 20, 2006, 7 pages.
Non-Final Office Action for U.S. Appl. No. 11/355,209, dated May 15, 2009, 12 pages.
International Search Report for PCT/US06/23911, mailed on Jun. 3, 2008, 8 pages.
International Search Report for PCT/US2006/023907, dated Mar. 2, 2007, 7 pages.
International Search Report for PCT/US2006/023906, dated Nov. 20, 2006, 6 pages.
International Search Report for PCT/US06/24034, dated Jun. 20, 2008, 10 pages.
International Search Report for PCT/US2006/024225, dated Feb. 26, 2006, 7 pages.
International Search Report for PCT/US2006/024226 dated Jun. 22, 2006, 7 pages.
Non Final Office Action for U.S. Appl. No. 11/405,737, dated May 18, 2009, 11 pages.
Non Final Office Action for U.S. Appl. No. 11/354,800, dated Sep. 13, 2007, 8 pages.
Non Final Office Action for U.S. Appl. No. 11/355,609, dated Jun. 5, 2009, 12 pages.
Non Final Office Action for U.S. Appl. No. 11/350,595, dated Jun. 26, 2009, 4 pages.
Non Final Office Action for U.S. Appl. No. 11/351,085, dated Jun. 1, 2009, 14 pages.
Non Final Office Action for U.S. Appl. No. 11/354,800, dated Jul. 15, 2008, 7 pages.
Final Office Action for U.S. Appl. No. 11/354,800, dated May 1, 2009, 8 pages.
Advisory Action for U.S. Appl. No. 11/352,575, dated Jul. 14, 2009, 3 pages.
Final Office Action for U.S. Appl. No. 11/352,575, dated Apr. 28, 2009, 19 pages.
Non Final Office Action for U.S. Appl. No. 11/352,575, dated Sep. 2, 2008, 15 pages.
Non Final Office Action for U.S. Appl. No. 11/352,662, dated Jun. 2, 2009, 12 pages.
Anderson et al., "Building multiuser interactive multimedia environments at MERL", Multimedia, IEEE vol. 2, Issue 4, Winter 1995 pp. 77-82, accessed at http://ieeexplore.ieee.org/search/wrapper.jsp?arnumber=482298 on Sep. 30, 2005.
Borchers et al., "Musical Design Patterns: An Example of a Human-Centered Model of Interactive Multimedia", 1997 International Conference on Multimedia Computing and Systems (ICMCS'97) p. 63, accessed at http://doi.ieeecomputersociety.org/10.1109/MMCS.1997.609564 on Sep. 30, 2005.
Fritzsche, "Multimedia Building Blocks for Distributed Applications", 1996 International Workshop on Multimedia Software Development (MMSD '96) p. 0041, accessed at http://doi.ieeecomputersociety.org/10.1109/MMSD.1996.557742 on Sep. 30, 2005.
International Search Report for PCT/US2006/024294 dated Apr. 30, 2007, 7 pages.
International Search Report for PCT/US2006/024423 dated Apr. 24, 2007, 5 pages.
International Search Report for PCT/US2006/024292 dated May 7, 2007, 7 pages.
C. Peng et al., "Digital Television Application Manager", Telecommunications Software and Multimedia Laboratory, Helsinki University of Technology, 2001 IEEE International Conference on Multimedia and Expo, 4 pages.
Non Final Office Action for U.S. Appl. No. 11/352,571 dated May 18, 2009, 7 pages.
Final Office Action dated Jan. 22, 2010 in related U.S. Appl. No. 11/350,595. 6 pages.
Final Office Action dated Dec. 1, 2009 in related U.S. Appl. No. 11/352,571, 9 pages.
International Search Report for PCT/US06/24034 dated Jun. 26, 2008, 1 page.
Final Office Action dated Jan. 11, 2010 in related U.S. Appl. No. 11/352,662, 13 pages.
Non-Final Office action dated Oct. 8, 2009 in related U.S. Appl. No. 11/354,800, 18 pages.
Final Office Action dated Nov. 27, 2009 in related U.S. Appl. No. 11/405,737 12 pages.
Final Office Action dated Dec. 10, 2009 in related U.S. Appl. No. 11/405,736, 14 pages.
Final Office Action dated Jan. 25, 2010 in related U.S. Appl. No. 11/351,085, 14 pages.
International Multimedia Conference; vol. 9 Proceedings of the Ninth ACM International Conference on Multimedia, Poellauer, Schwan, West, pp. 231-240, 2001.
Non-Final Office Action dated Dec. 2, 2009 in related U.S. Appl. No. 11/352,575, 23 pages.
Z-Order Correction Algorithm for Dialog Boxes, IBM Technical Disclosure Bulletin, IBM Corp. New York, US, vol. 37, No. 8, Aug. 1, 1994.
International Search Report for PCT/US06/24292 dated May 7, 2007, 1 page.

(56) References Cited

OTHER PUBLICATIONS

Author Unknown, MHP Project Office: "Digital Video Broadcasting (DVB); Multimedia Home Platform (MHP) Specification 1.1.2" Apr. 25, 2005. Part 1, 405 pages.

Author Unknown, MHP Project Office: "Digital Video Broadcasting (DVB); Multimedia Home Platform (MHP) Specification 1.1.2" Apr. 25, 2005. Part 2, 405 pages.

Author Unknown, MHP Project Office: "Digital Video Broadcasting (DVB); Multimedia Home Platform (MHP) Specification 1.1.2" Apr. 25, 2005. Part 3, 362 pages.

Final Office Action dated Dec. 11, 2009 in related U.S. Appl. No. 11/355,209, 16 pages.

Non-Final Office Action for U.S. Appl. No. 11/405,737, dated Apr. 30, 2009, 11 pages.

Ben Willmore, "Adobe Photoshop CS Studio Techniques", Pub Feb. 11, 2004, Safari Online Books, Ch. 3 Section titled "Layers Primer", pp. 104-110, Adobe Press.

Dekeyser, S. et al., "Path locks for XML document collaboration", Web Information Systems Engineering, 2002. Wise 2002. Proceedings of the Third International Conference 2002, Piscataway, NJ, USA, IEEE, 12 2002, pp. 105-114.

Pihkala, K. et al., "Design of a dynamic smil player", Multimedia and Expo, 2002. ICME '02. Proceedings. 2002 IEEE International Conference on Lausanne, Switzerland 2002, Piscataway, NJ, USA, IEEE, US, vol. 2, 26 2002, pp. 189-192.

Non-Final Office Action for U.S. Appl. No. 11/405,736, dated May 1, 2009, 10 pages.

"International Search Report" for PCT/US06/23907, dated Apr. 26, 2007, 1 page.

Non-Final Office Action for U.S. Appl. No. 11/352,571, dated Apr. 30, 2009, 7 pages.

"International Search Report", PCT/US06/23912, Jun. 19, 2008, 13 pages.

Non-Final Office Action for U.S. Appl. No. 11/405,816, dated Jun. 3, 2008, 12 pages.

Benekidt, M. et al., "Managing XML Data: An Abridged Overview", Computing in Science and Engineering, IEEE Service Center, Los Alamitos, CA, US, vol. 6, No. 4, Jul. 2004, pp. 12-19.

Barton C. et al., "Streaming XPath processing with forward and backward axes", Proceedings 19th International Conference on Data Engineering, Bangalore, India, Conf. 19, 2003, p. 455-466.

Blu-ray Disc Association: "Application Definition Blu-ray Disc Format BD-J Baseline Application and Logical Model Definition for BD-ROM", Internet Citation, Mar. 1, 2005, retrieved Jun. 18, 2008, http://www.blurayjukebox.com/pdfs/bdj_gem_application_definition_0503 07-13404, pp. 1-45.

Blu-Ray Disc: "White paper Blu-ray Disc Format. 2.B Audio Visual Application Format Specifications for BD-ROM", Internet Citation, Mar. 2005, retrieved Nov. 16, 2007, http://www.blu-raydisc.com/assets/downloadablefile/2b_bdrom_audiovisualapplication_0305-12955-13403.pdf, pp. 1-26.

Juliana Freire, et al., "Managing XML Data: An Abridged Overview", Computing in Science & Engineering, 2004 IEEE, pp. 12-19 (8 total pages).

Notice of Preliminary Rejection with English Language translation issued Jul. 11, 2013, in connection with Korean Patent Application No. 10-2007-7030958 (7 pages total).

"System performance measure in solaris", Aug. 12, 2004 (retrieved from http://blog.naver.com/avicom/120004914987) with English Language translation (10 pages total).

Slingerland et al., "Cache Performance for Multimedia Applications", ICS '01: Proceedings of the 15th International Conference on Supercomputing, Jun. 2001, pp. 1-14.

U.S Final Office Action mailed Jan. 16, 2014 in connection with corresponding U.S. Appl. No. 11/405,737 (23 pages total).

Foxboro® An Invensys Company; I/A Series® Software Logic (LOGIC) Block; 1994, PSS 21S-3L5 B4; pp. 1 and 2 (2 pages total).

\* cited by examiner

SYNCHRONIZATION ASPECTS OF INTERACTIVE MULTIMEDIA PRESENTATION MANAGEMENT

STATEMENT OF RELATED APPLICATION

This application claims the benefit of provisional application No. 60/695,944, filed Jul. 1, 2005, which is incorporated by reference herein.

BACKGROUND

Multimedia players are devices that render combinations of video, audio or data content ("multimedia presentations") for consumption by users. Multimedia players such as DVD players currently do not provide for much, if any, user interactivity during play of video content—video content play is generally interrupted to receive user inputs other than play speed adjustments. For example, a user of a DVD player must generally stop the movie he is playing to return to a menu that includes options allowing him to select and receive features such as audio commentary, actor biographies, or games.

Interactive multimedia players are devices (such devices may include hardware, software, firmware, or any combination thereof) that render combinations of interactive content concurrently with traditional video, audio or data content ("interactive multimedia presentations"). Although any type of device may be an interactive multimedia player, devices such as optical media players (for example, DVD players), computers, and other electronic devices are particularly well positioned to enable the creation of, and consumer demand for, commercially valuable interactive multimedia presentations because they provide access to large amounts of relatively inexpensive, portable data storage.

Interactive content is generally any user-selectable visible or audible object presentable alone or concurrently with other video, audio or data content. One kind of visible object is a graphical object, such as a circle, that may be used to identify and/or follow certain things within video content—people, cars, or buildings that appear in a movie, for example. One kind of audible object is a click sound played to indicate that the user has selected a visible object, such as the circle, using a device such as a remote control or a mouse. Other examples of interactive content include, but are not limited to, menus, captions, and animations.

To enhance investment in interactive multimedia players and interactive multimedia presentations, it is desirable to ensure accurate synchronization of the interactive content component of interactive multimedia presentations with the traditional video, audio or data content components of such presentations. Accurate synchronization generally prioritizes predictable and glitch-free play of the video, audio or data content components. For example, when a circle is presented around a car in a movie, the movie should generally not pause to wait for the circle to be drawn, and the circle should follow the car as it moves.

It will be appreciated that the claimed subject matter is not limited to implementations that solve any or all of the disadvantages of specific interactive multimedia presentation systems or aspects thereof.

SUMMARY

In general, an interactive multimedia presentation includes one or more of the following: a predetermined presentation play duration, a video content component, and an interactive content component. The video content component is referred to as a movie for exemplary purposes, but may in fact be video, audio, data, or any combination thereof. The video content component is arranged into a number of frames and/or samples for rendering by a video content manager. The video content manager receives video data (video, audio, or data samples, or combinations thereof) from one or more sources (such as from an optical medium or another source) at a rate that is based on a timing signal, such as a clock signal. The rate of the timing signal may vary based on the play speed of the video content—the movie may be paused, slow-forwarded, fast-forwarded, slow-reversed, or fast-reversed, for example.

The interactive content is arranged for rendering by an interactive content manager at a rate based on a timing signal, such as a continuous clock signal. The interactive content component of the presentation is in the form of one or more applications. An application includes instructions in declarative form or in script form. One type of declarative form includes extensible markup language ("XML") data structures. The application instructions are provided for organizing, formatting, and synchronizing the presentation of media objects to a user, often concurrently with the video content component.

Methods, systems, apparatuses, and articles of manufacture discussed herein entail using application instructions to specify a time, or a time interval, when a particular media object is renderable. The time, or time interval, is specifiable with reference to either a first timing signal having a rate that is based on the play speed of the interactive multimedia presentation (such as the timing signal used by the video content manager), or with reference to a second timing signal having a continuous predetermined rate (such as the timing signal used by the interactive content manager).

One example of an application instruction usable as described above is a markup element associated with an XML data structure. An example of an XML data structure is a timing document or container or another type of document or container. An attribute of the markup element that is defined by a particular syntax or usage context of the element may be used to specify times based on either the first or second timing signals. An exemplary attribute is the "clock" attribute that is specified by one or more XML schemas for use in applications associated with high-definition DVD movies.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter.

DETAILED DESCRIPTION

Figure 1:
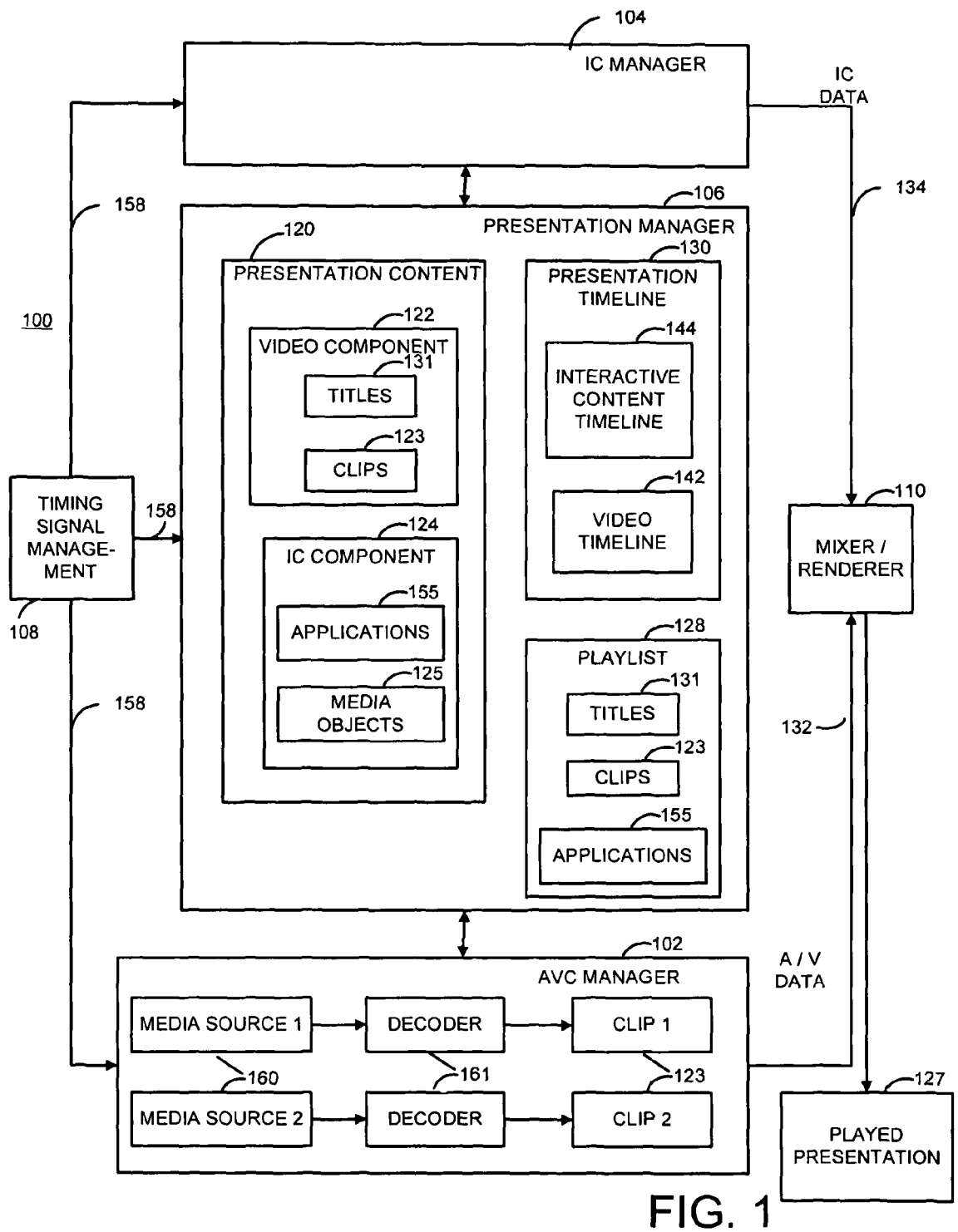
FIG. 1 is a simplified functional block diagram of an interactive multimedia presentation system.

Turning to the drawings, where like numerals designate like components, FIG. 1 is a simplified functional block diagram of an interactive multimedia presentation system ("Presentation System") 100. Presentation System 100 includes an audio/video content ("AVC") manager 102, an interactive content ("IC") manager 104, a presentation manager 106, a timing signal management block 108, and a mixer/renderer 110. In general, design choices dictate how specific functions of Presentation System 100 are implemented. Such functions may be implemented using hardware, software, or firmware, or combinations thereof.

In operation, Presentation System 100 handles interactive multimedia presentation content ("Presentation Content") 120. Presentation Content 120 includes a video content component ("video component") 122 and an interactive content component ("IC component") 124. Video component 122 and IC component 124 are generally, but need not be, handled as separate data streams, by AVC manager 102 and IC manager 104, respectively.

Presentation System 100 also facilitates presentation of Presentation Content 120 to a user (not shown) as played presentation 127. Played Presentation 127 represents the visible and/or audible information associated with Presentation Content 120 that is produced by mixer/renderer 110 and receivable by the user via devices such as displays or speakers (not shown). For discussion purposes, it is assumed that Presentation Content 120 and played presentation 127 represent high-definition DVD movie content, in any format. It will be appreciated, however, that Presentation Content 120 and Played Presentation 127 may be any type of interactive multimedia presentation now known or later developed.

Video component 122 represents the traditional video, audio or data components of Presentation Content 120. For example, a movie generally has one or more versions (a version for mature audiences, and a version for younger audiences, for example); one or more titles 131 with one or more chapters (not shown) associated with each title (titles are discussed further below, in connection with presentation manager 106); one or more audio tracks (for example, the movie may be played in one or more languages, with or without subtitles); and extra features such as director's commentary, additional footage, trailers, and the like. It will be appreciated that distinctions between titles and chapters are purely logical distinctions. For example, a single perceived media segment could be part of a single title/chapter, or could be made up of multiple titles/chapters. It is up to the content authoring source to determine the applicable logical distinctions. It will also be appreciated that although video component 122 is referred to as a movie, video component 122 may in fact be video, audio, data, or any combination thereof.

The video, audio, or data that forms video component 122 originates from one or more media sources 160 (for exemplary purposes, two media sources 160 are shown within A/V manager 102). A media source is any device, location, or data from which video, audio, or data is derived or obtained. Examples of media sources include, but are not limited to, networks, hard drives, optical media, alternate physical disks, and data structures referencing storage locations of specific video, audio, or data.

Groups of samples of video, audio, or data from a particular media source are referred to as clips 123 (shown within video component 122, AVC manager 102, and playlist 128). Referring to AVC manager 102, information associated with clips 123 is received from one or more media sources 160 and decoded at decoder blocks 161. Decoder blocks 161 represent any devices, techniques or steps used to retrieve renderable video, audio, or data content from information received from a media source 160. Decoder blocks 161 may include encoder/decoder pairs, demultiplexers, or decrypters, for example. Although a one-to-one relationship between decoders and media sources is shown, it will be appreciated that one decoder may serve multiple media sources, and vice-versa.

Audio/video content data ("A/V data") 132 is data associated with video component 122 that has been prepared for rendering by AVC manager 102 and transmitted to mixer/renderer 110. Frames of A/V data 134 generally include, for each active clip 123, a rendering of a portion of the clip. The exact portion or amount of the clip rendered in a particular frame may be based on several factors, such as the characteristics of the video, audio, or data content of the clip, or the formats, techniques, or rates used to encode or decode the clip.

IC component 124 includes media objects 125, which are user-selectable visible or audible objects, optionally presentable concurrently with video component 122, along with any instructions (shown as applications 155 and discussed further below) for presenting the visible or audible objects. Media objects 125 may be static or animated. Examples of media objects include, among other things, video samples or clips, audio samples or clips, graphics, text, and combinations thereof.

Media objects 125 originate from one or more sources (not shown). A source is any device, location, or data from which media objects are derived or obtained. Examples of sources for media objects 125 include, but are not limited to, networks, hard drives, optical media, alternate physical disks, and data structures referencing storage locations of specific media objects. Examples of formats of media objects 125 include, but are not limited to, portable network graphics ("PNG"), joint photographic experts group ("JPEG"), moving picture experts group ("MPEG"), multiple-image network graphics ("MNG"), audio video interleave ("AVI"), extensible markup language ("XML"), hypertext markup language ("HTML"), and extensible HTML ("XHTML").

Applications 155 provide the mechanism by which Presentation System 100 presents media objects 125 to a user. Applications 155 represent any signal processing method or stored instruction(s) that electronically control predetermined operations on data. It is assumed for discussion purposes that IC component 124 includes three applications 155, which are discussed further below in connection with FIGS. 2 and 3. The first application presents a copyright notice prior to the movie, the second application presents, concurrently with visual aspects of the movie, certain media objects that provide a menu having multiple user-selectable items, and the third application presents one or more media objects that provide graphic overlays (such as circles) that may be used to identify and/or follow one or items appearing in the movie (a person, a car, a building, or a product, for example).

Interactive content data ("IC data") 134 is data associated with IC component 124 that has been prepared for rendering by IC manager 104 and transmitted to mixer/renderer 110. Each application has an associated queue (not shown), which holds one or more work items (not shown) associated with rendering the application.

Presentation manager 106, which is configured for communication with both AVC manager 104 and IC manager 102, facilitates handling of Presentation Content 120 and presentation of played presentation 127 to the user. Presentation manager 106 has access to a playlist 128. Playlist 128 includes, among other things, a time-ordered sequence of clips 123 and applications 155 (including media objects 125) that are presentable to a user. The clips 123 and applications 155/media objects 125 may be arranged to form one or more titles 131. For exemplary purposes, one title 131 is discussed herein. Playlist 128 may be implemented using an extensible markup language ("XML") document, or another data structure.

Presentation manager 106 uses playlist 128 to ascertain a presentation timeline 130 for title 131. Conceptually, presentation timeline 130 indicates the times within title 131 when specific clips 123 and applications 155 are presentable to a user. A sample presentation timeline 130, which illustrates exemplary relationships between presentation of clips 123 and applications 155 is shown and discussed in connection with FIG. 2. In certain circumstances, it is also useful to use playlist 128 and/or presentation timeline 130 to ascertain a video content timeline ("video timeline") 142 and an interactive content timeline ("IC timeline") 144.

Presentation manager 106 provides information, including but not limited to information about presentation timeline 130, to AVC manager 102 and IC manager 104. Based on input from presentation manger 206, AVC manager 102 prepares A/V data 132 for rendering, and IC manager 104 prepares IC data 134 for rendering.

Figure 4:
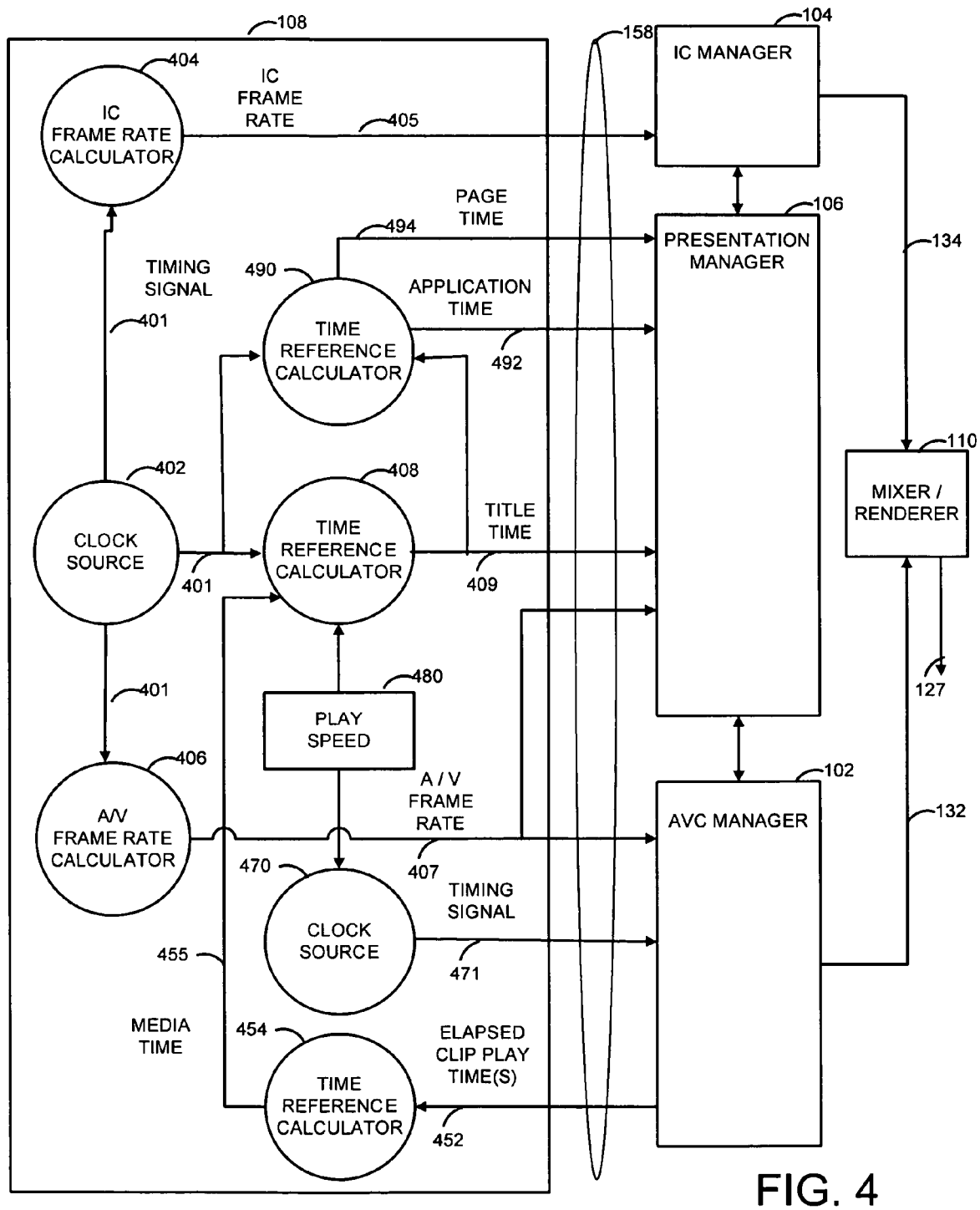
FIG. 4 is a simplified functional block diagram illustrating the timing signal management block of FIG. 1 in more detail.

Timing signal management block 108 produces various timing signals 158, which are used to control the timing for preparation and production of A/V data 132 and IC data 134 by AVC manager 102 and IC manager 104, respectively. In particular, timing signals 158 are used to achieve frame-level synchronization of A/V data 132 and IC data 134. Details of timing signal management block 108 and timing signals 158 are discussed further below, in connection with FIG. 4.

Mixer/renderer renders A/V data 132 in a video plane (not shown), and renders IC data 134 in a graphics plane (not shown). The graphics plane is generally, but not necessarily, overlayed onto the video plane to produce played presentation 127 for the user.

Figure 2:
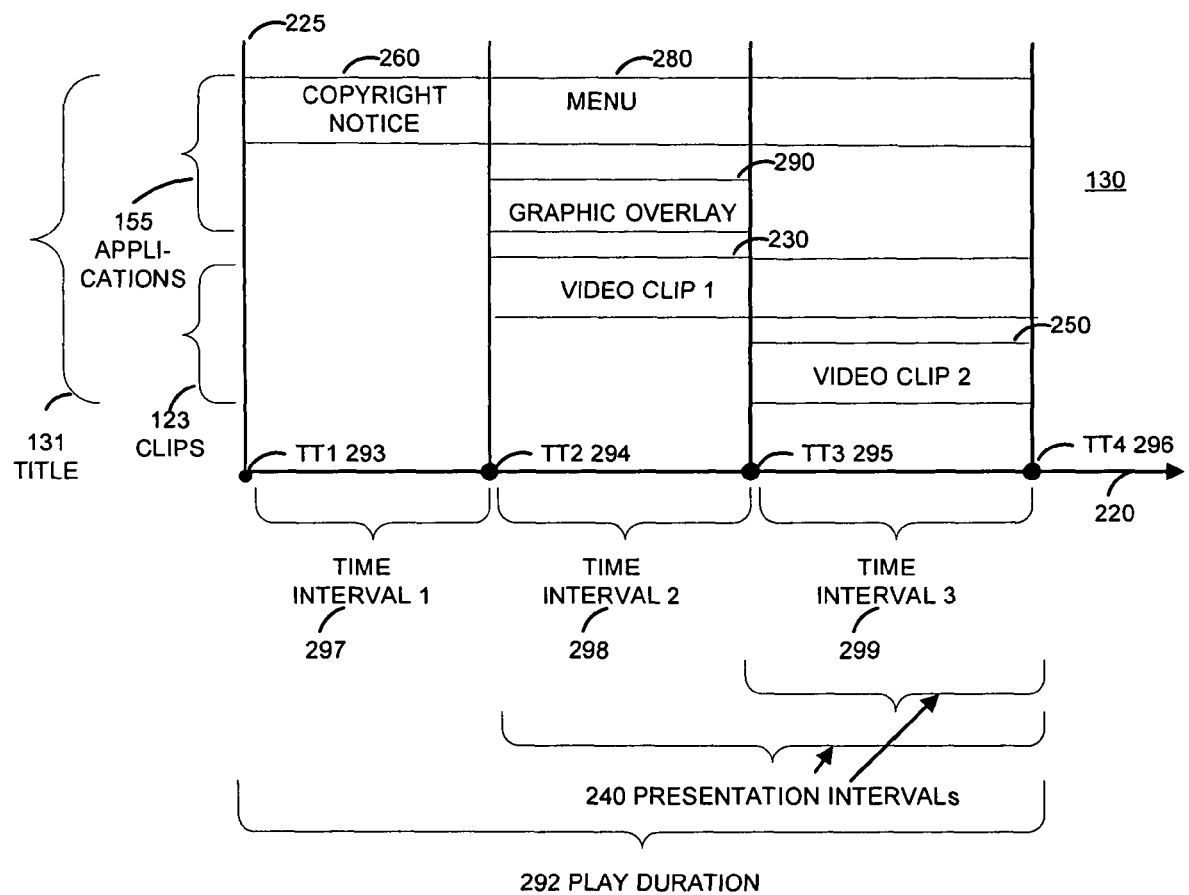
FIG. 2 is a graphical illustration of an exemplary presentation timeline, which is ascertainable from the playlist shown in FIG. 1.

With continuing reference to FIG. 1, FIG. 2 is a graphical illustration of a sample presentation timeline 130 for title 131 within playlist 128. Time is shown on horizontal axis 220. Information about video component 122 (clips 123 are illustrated) and IC component 124 (applications 155, which present media objects 125, are illustrated) is shown on vertical axis 225. Two clips 123 are shown, a first video clip ("video clip 1") 230 and a second video clip ("video clip 2") 250. For discussion purposes, as mentioned above in connection with FIG. 1, it is assumed that a first application is responsible for presenting one or more media objects (for example, images and/or text) that comprise copyright notice 260. A second application is responsible for presenting certain media objects that provide user-selectable items (for example, buttons with associated text or graphics) of menu 280. A third application is responsible for presenting one or more media objects that provide graphic overlay 290. Menu 280 is displayed concurrently with video clip 1 230 and video clip 2 250, and graphic overlay 290 is displayable concurrently with video clip 1 230 and menu 280.

The particular amount of time along horizontal axis 220 in which title 131 is presentable to the user is referred to as play duration 292 of title 131. Specific times within play duration 292 are referred to as title times. Four title times ("TTs") are shown on presentation timeline 130—TT1 293, TT2 294, TT3 295, and TT4 296. Because a title may be played once or may be played more than once (in a looping fashion, for example) play duration 292 is determined based on one iteration of title 131. Play duration 292 may be determined with respect to any desired reference, including but not limited to a predetermined play speed (for example, normal, or 1×, play speed), a predetermined frame rate, or a predetermined timing signal status. Play speeds, frame rates, and timing signals are discussed further below, in connection with FIG. 4. It will be appreciated that implementation-specific factors such as encoding techniques, display techniques, and specific rules regarding play sequences and timing relationships among clips and media objects for each title may impact upon exact values of a title's play duration and title times therein. The terms play duration and title times are intended to encompass all such implementation-specific details. Although title times at/within which content associated with IC component 124 is presentable are generally predetermined, it will be appreciated that actions taken when the user interacts with such content may only be determined based on user input while Played Presentation 127 is playing. For example, the user may select, activate, or deactivate certain applications, media objects, and/or additional content associated therewith during play of Played Presentation 127.

Other times and/or durations within play duration 292 are also defined and discussed herein. Video presentation intervals 240 are defined by beginning and ending times of play duration 292 between which particular content associated with video component 122 is playable. For example, video clip 1 230 has a presentation interval 240 between title times TT2 294 and TT4 294, and video clip 2 250 has a presentation interval 240 between title times TT3 295 and TT4 296. Application presentation intervals, application play durations, page presentation intervals, and page durations are also defined and discussed below, in connection with FIG. 3.

With continuing reference to FIG. 2, two types of time intervals are present within play duration 292. A first type of time interval is one in which video component 122 is not scheduled for presentation. Time interval 1 297, the time preceding presentation of the movie when copyright notice 260 is displayed, is an example of the first type of time interval. Although the application that presents copyright notice 260 is scheduled for presentation during time interval 1 297, it will be appreciated that it is not necessary for an application to be scheduled for presentation during the first type of time interval.

A second type of time interval is one in which video component 122 is scheduled for presentation. Time interval 2 298 and time interval 3 299 are examples of the second type of time interval. Sometimes, more than one video may be scheduled for presentation during the second type of time interval. Often, but not always, interactive content is presentable during the second type of time interval. For example, in time interval 2 298, menu 280 and graphic overlay 290 are scheduled for presentation concurrently with video clip 230. In time interval 3 299, menu 280 is scheduled for concurrent presentation with video clip 1 230 and video clip 2 250.

Figure 3:
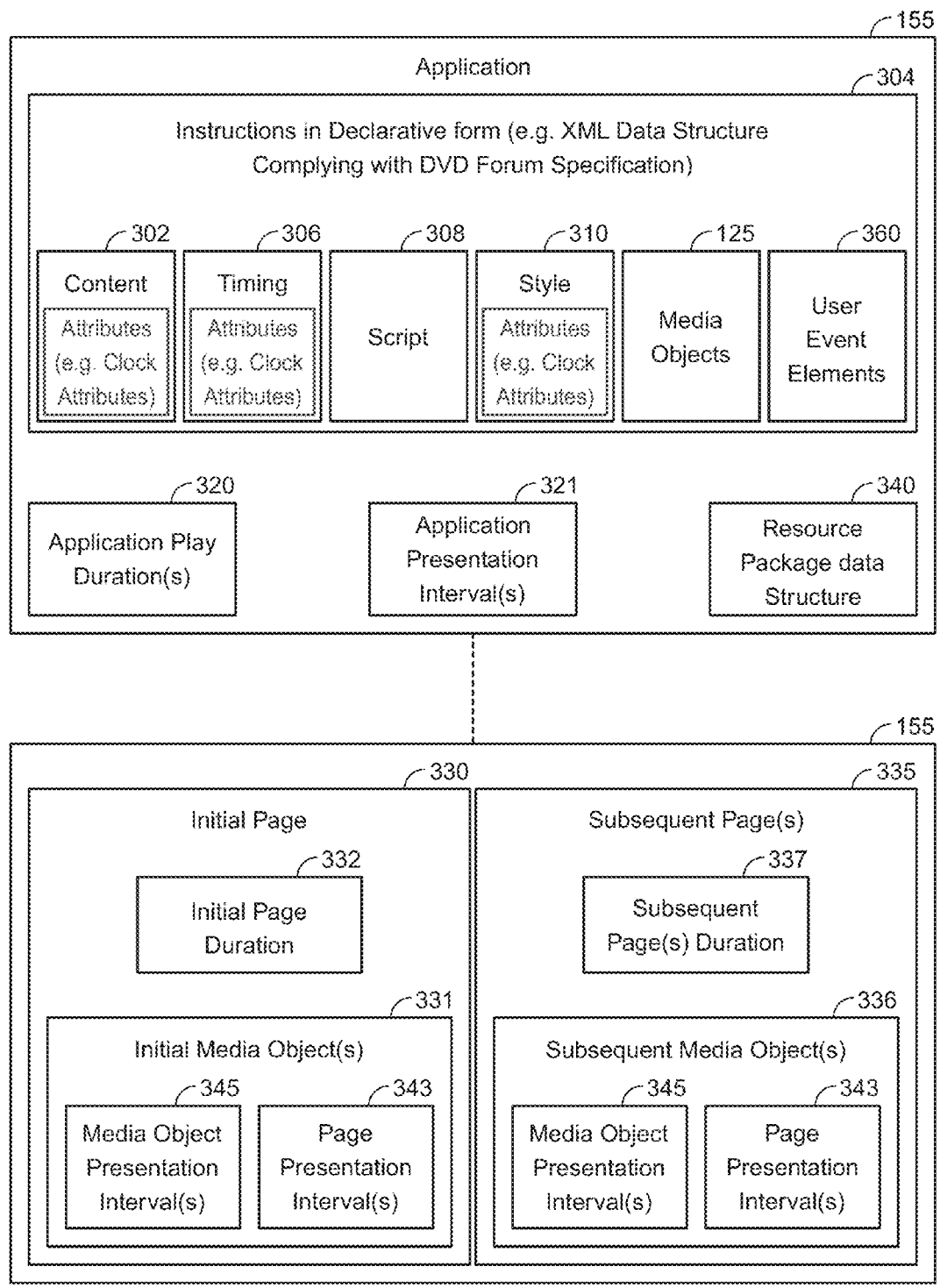
FIG. 3 is a simplified functional block diagram of an application associated with the interactive multimedia presentation shown in FIG. 1.

With continuing reference to FIGS. 1 and 2, FIG. 3 is a functional block diagram of a single application 155. Application 155 is generally representative of applications responsible for presenting media objects 260, 280, and 290. Application 155 includes instructions 304 (discussed further below). Application 155 has associated therewith a resource package data structure 340 (discussed further below), an application play duration 320, and one or more application presentation intervals 321.

Application play duration 320 is a particular amount of time, with reference to an amount (a part or all) of play duration 292 within which media objects 125 associated with application 155 are presentable to and/or selectable by a recipient of played presentation 127. In the context of FIG. 2, for example, application 155 responsible for copyright notice 260 has an application play duration composed of the amount of time between TT1 293 and TT2 294. The application responsible for menu 280 has an application play duration composed of the amount of time between TT2 294 and TT4 296. The application responsible for graphical overlay 290 has an application play duration composed of the amount of time between TT2 294 and TT3 295.

The intervals defined by beginning and ending title times obtained when an application play duration 320 associated with a particular application is conceptualized on presentation timeline are referred to as application presentation intervals 321. For example, the application responsible for copyright notice 206 has an application presentation interval beginning at TT1 293 and ending at TT2 294, the application responsible for menu 280 has an application presentation interval beginning at TT2 294 and TT4 296, and the application responsible for graphic overlay 290 has an application presentation interval beginning at TT2 294 and TT3 295.

Referring again to FIG. 3, in some cases, application 155 may have more than one page. A page is a logical grouping of one or more media objects that are contemporaneously presentable within a particular application play duration 320 and/or application presentation interval 321. Media objects associated with a particular page, however, may be presented concurrently, serially, or a combination thereof. As shown, an initial page 330 has associated initial media object(s) 331, and subsequent pages 335 have associated media object(s) 336. Each page, in turn, has its own page duration. As shown, initial page 330 has page duration 332, and subsequent page(s) 335 has page duration 337. A page duration is the particular amount of time, with reference to an amount (a part or all) of application play duration 330, in which media objects 125 associated with a particular page are presentable to (and/or selectable by) a user. The intervals defined by beginning and ending title times obtained when a page play duration associated with a particular page is conceptualized on the presentation timeline are referred to as page presentation intervals 343. Page presentation intervals 343 are sub-intervals of application presentation intervals 321. Specific media object presentation intervals 345 may also be defined within page presentation intervals 343.

The number of applications and pages associated with a given title, and the media objects associated with each application or page, are generally logical distinctions that are matters of design choice. Multiple pages may be used when it is desirable to manage (for example, limit) the number or amount of resources associated with an application that are loaded into memory during execution of the application. Resources for an application include the media objects used by the application, as well as instructions 304 for rendering the media objects. For example, when an application with multiple pages is presentable, it may be possible to only load into memory only those resources associated with a currently presentable page of the application.

Resource package data structure 340 is used to facilitate loading of application resources into memory prior to execution of the application. Resource package data structure 340 references memory locations where resources for that application are located. Resource package data structure 340 may be stored in any desirable location, together with or separate from the resources it references. For example, resource package data structure 340 may be disposed on an optical medium such a high-definition DVD, in an area separate from video component 122. Alternatively, resource package data structure 340 may be embedded into video component 122. In a further alternative, the resource package data structure may be remotely located. One example of a remote location is a networked server. Topics relating to handling the transition of resources for application execution, and between applications, are not discussed in detail herein.

Referring again to application 155 itself, instructions 304, when executed, perform tasks related to rendering of media objects 125 associated with application 155, based on user input. One type of user input (or a result thereof) is a user event. User events are actions or occurrences initiated by a recipient of played presentation 127 that relate to IC component 124. User events are generally, but not necessarily, asynchronous. Examples of user events include, but are not limited to, user interaction with media objects within played presentation 127, such as selection of a button within menu 280, or selection of the circle associated with graphical overlay 290. Such interactions may occur using any type of user input device now known or later developed, including a keyboard, a remote control, a mouse, a stylus, or a voice command. It will be appreciated that application 155 may respond to events other than user events, but such events are not specifically discussed herein.

In one implementation, instructions 304 are computer-executable instructions encoded in computer-readable media (discussed further below, in connection with FIG. 9). In the examples set forth herein, instructions 304 are implemented using either script 308 or markup elements 302, 306, 310, 312, 360. Although either script or markup elements may be used alone, in general, the combination of script and markup elements enables the creation of a comprehensive set of interactive capabilities for the high-definition DVD movie.

Script 308 includes instructions 304 written in a non-declarative programming language, such as an imperative programming language. An imperative programming language describes computation in terms of a sequence of commands to be performed by a processor. In most cases where script 308 is used, the script is used to respond to user events. Script 308 is useful in other contexts, however, such as handling issues that are not readily or efficiently implemented using markup elements alone. Examples of such contexts include system events and resource management (for example, accessing cached or persistently stored resources). In one implementation, script 308 is ECMAScript as defined by ECMA International in the ECMA-262 specification. Common scripting programming languages falling under ECMA-262 include JavaScript and JScript. In some settings, it may be desirable to implement 308 using a subset of ECMAScript 262, such as ECMA-327, along with a host environment and a set of application programming interfaces.

Markup elements 302, 306, 310, 312, and 360 represent instructions 304 written in a declarative programming language, such as Extensible Markup Language ("XML"). In XML, elements are logical units of information defined, using start-tags and end-tags, within XML documents. XML documents are data objects that are made up of storage units called entities (also called containers), which contain either parsed or unparsed data. Parsed data is made up of characters, some of which form character data, and some of which form markup. Markup encodes a description of the document's storage layout and logical structure. There is one root element in an XML document, no part of which appears in the content of any other element. For all other elements, the start-tags and end-tags are within the content of other elements, nested within each other.

An XML schema is a definition of the syntax(es) of a class of XML documents. One type of XML schema is a general-purpose schema. Some general-purpose schemas are defined by the World Wide Web Consortium ("W3C"). Another type of XML schema is a special-purpose schema. In the high-definition DVD context, for example, one or more special-purpose XML schemas have been promulgated by the DVD Forum for use with XML documents in compliance with the DVD Specifications for High Definition Video. It will be appreciated that other schemas for high-definition DVD movies, as well as schemas for other interactive multimedia presentations, are possible.

At a high level, an XML schema includes: (1) a global element declaration, which associates an element name with an element type, and (2) a type definition, which defines attributes, sub-elements, and character data for elements of that type. Attributes of an element specify particular properties of the element using a name/value pair, with one attribute specifying a single element property.

Content elements 302, which may include user event elements 360, are used to identify particular media object elements 312 presentable to a user by application 155. Media object elements 312, in turn, generally specify locations where data defining particular media objects 125 is disposed. Such locations may be, for example, locations in persistent local or remote storage, including locations on optical media, or on wired or wireless, public or private networks, such as on the Internet, privately-managed networks, or the World Wide Web. Locations specified by media object elements 312 may also be references to locations, such as references to resource package data structure 340. In this manner, locations of media objects 125 may be specified indirectly.

Timing elements 306 are used to specify the times at, or the time intervals during, which particular content elements 302 are presentable to a user by a particular application 155. Examples of timing elements include par, timing, or seq elements within a time container of an XML document.

Style elements 310 are generally used to specify the appearance of particular content elements 302 presentable to a user by a particular application.

User event elements 360 represent content elements 302, timing elements 306 or style elements 310 that are used to define or respond to user events.

Markup elements 302, 306, 310, and 360 have attributes that are usable to specify certain properties of their associated media object elements 312/media objects 125. In one implementation, these attributes/properties represent values of one or more clocks or timing signals (discussed further below, in connection with FIG. 4). Using attributes of markup elements that have properties representing times or time durations is one way that synchronization between IC component 124 and video component 122 is achieved while a user receives played presentation 127.

A sample XML document containing markup elements is set forth below (script 308 is not shown). The sample XML document includes style 310 and timing 306 elements for performing a crop animation on a content element 302, which references a media object element 312 called "id." The location of data defining media object 125 associated with the "id" media object element is not shown.

The sample XML document begins with a root element called "xml." Following the root element, several namespace "xmlns" fields refer to locations on the World Wide Web where various schemas defining the syntax for the sample XML document, and containers therein, can be found. In the context of an XML document for use with a high-definition DVD movie, for example, the namespace fields may refer to websites associated with the DVD Forum.

One content element 302 referred to as "id" is defined within a container described by tags labeled "body." Style elements 310 (elements under the label "styling" in the example) associated with content element "id" are defined within a container described by tags labeled "head." Timing elements 306 (elements under the label "timing") are also defined within the container described by tags labeled "head."

```
- <> <root xml:lang="en"
    xmlns="http://www.dvdforum.org/2005/ihd"
  xmlns:style="http://www.dvdforum.org/2005/ihd#style"
  xmlns:state="http://www.dvdforum.org/2005/ihd#state"
- <> <head> (Head is the container of style and timing properties)
    - <> <styling> (Styling Properties are here)
        <style id="s-p" style:fontSize="10px" />
        <style id="s-bosbkg" style:opacity="0.4"
          style:backgroundImage="url('../../img/pass/boston.png')" />
        <style id="s-div4" style="s-bosbkg" style:width="100px"
          style:height="200px" />
        <style id="s-div5" style:crop="0 0 100 100" style="s-bosbkg"
          style:width="200px" style:height="100px" />
        <style id="s-div6" style:crop="100 50 200 150"
          style="s-bosbkg"
          style:width="100px" style:height="100px" />
    </styling>
    - <> <Timing> (Timing Properties are here)
        - <> <timing clock="title">
        - <> <defs>
            - <> <g id="xcrop">
                <set style:opacity="1.0" />
                <animate style:crop="0 0 100 200;200 0 300 200" />
            </g>
            - <> <g id="ycrop">
                <set style:opacity="1.0" />
                <animate style:crop="0 0 100 100;0 100 100 200" />
            </g>
            - <> <g id="zoom">
                <set style:opacity="1.0" />
                <animate style:crop="100 50 200 150;125 75 150 100" />
            </g>
        </defs>
        - <> <seq>
            <cue use="xcrop" select="//div[@id='d4']" dur="3s" />
            <cue use="ycrop" select="//div[@id='d5']" dur="3s" />
            <cue use="zoom" select="//div[@id='d6']" dur="3s" />
        </seq>
    </timing>
</head>
- <> <body state:foreground="true"> Body is the container for
    content elements
    - <> <div id="d1"> The content starts here.
    - <> <p style:textAlign="center">
    Crop Animation Test
    <br />
    <span style:fontSize="12px">Start title clock to animate
    crop.</span>
    </p>
    </div>
    <> <div id="d4" style="s-div4" style:position="absolute"
      style:x="10%" style:y="40%">
```

```
            <p style="s-p">x: 0 -> 200</p>
        </div>
        - <> <div id="d5" style="s-div5" style:position="absolute"
        style:x="30%" style:y="40%">
            <p style="s-p">y: 0 -> 100</p>
        </div>
        - <> <div id="d6" style="s-div6" style:position="absolute"
        style:x="70%" style:y="60%">
            - <> <p style="s-p">
            x: 100 -> 125
            <br />
            y: 50 -> 75
            </p>
        </div>
    </body>
</root>
```

With continuing reference to FIGS. 1-3, FIG. 4 is a simplified functional block diagram illustrating various components of timing signal management block 108 and timing signals 158 in more detail.

Timing signal management block 108 is responsible for the handling of clocks and/or timing signals that are used to determine specific times or time durations within Presentation System 100. As shown, a continuous timing signal 401 is produced at a predetermined rate by a clock source 402. Clock source 402 may be a clock associated with a processing system, such as a general-purpose computer or a special-purpose electronic device. Timing signal 401 produced by clock source 402 generally changes continually as a real-world clock would—within one second of real time, clock source 402 produces, at a predetermined rate, one second worth of timing signals 401. Timing signal 401 is input to IC frame rate calculator 404, A/V frame rate calculator 406, time reference calculator 408, and time reference calculator 490.

IC frame rate calculator 404 produces a timing signal 405 based on timing signal 401. Timing signal 405 is referred to as an "IC frame rate," which represents the rate at which frames of IC data 134 are produced by IC manager 104. One exemplary value of the IC frame rate is 30 frames per second. IC frame rate calculator 404 may reduce or increase the rate of timing signal 401 to produce timing signal 405.

Frames of IC data 134 generally include, for each valid application 155 and/or page thereof, a rendering of each media object 125 associated with the valid application and/or page in accordance with relevant user events. For exemplary purposes, a valid application is one that has an application presentation interval 321 within which the current title time of play duration 292 falls, based on presentation timeline 130. It will be appreciated that an application may have more than one application presentation interval. It will also be appreciated that no specific distinctions are made herein about an application's state based on user input or resource availability.

A/V frame rate calculator 406 also produces a timing signal—timing signal 407—based on timing signal 401. Timing signal 407 is referred to as an "A/V frame rate," which represents the rate at which frames of A/V data 132 are produced by AVC manager 102. The A/V frame rate may be the same as, or different from, IC frame rate 405. One exemplary value of the A/V frame rate is 24 frames per second. A/V frame rate calculator 406 may reduce or increase the rate of timing signal 401 to produce timing signal 407.

A clock source 470 produces timing signal 471, which governs the rate at which information associated with clips 123 is produced from media source(s) 161. Clock source 470 may be the same clock as clock 402, or based on the same clock as clock source 402. Alternatively, clocks 470 and 402 may be altogether different, and/or have different sources. Clock source 470 adjusts the rate of timing signal 471 based on a play speed input 480. Play speed input 480 represents user input received that affects the play speed of played presentation 127. Play speed is affected, for example, when a user jumps from one part of the movie to another (referred to as "trick play"), or when the user pauses, slow-forwards, fast-forwards or slow-reverses, or fast-reverses the movie. Trick play may be achieved by making selections from menu 280 (shown in FIG. 2) or in other manners.

Time references 452 represent the amounts of time that have elapsed within particular presentation intervals 240 associated with active clips 123. For purposes of discussion herein, an active clip is one that has a presentation interval 240 within which the current title time of play duration 292 falls, based on presentation timeline 130. Time references 452 are referred to as "elapsed clip play time(s)." Time reference calculator 454 receives time references 452 and produces a media time reference 455. Media time reference 455 represents the total amount of play duration 292 that has elapsed based on one or more time references 452. In general, when two or more clips are playing concurrently, only one time reference 452 is used to produce media time reference 455. The particular clip used to determine media time reference 455, and how media time reference 455 is determined based on multiple clips, is a matter of implementation preference.

Time reference calculator 408 receives timing signal 401, media time reference 455, and play speed input 480, and produces a title time reference 409. Title time reference 409 represents the total amount of time that has elapsed within play duration 292 based on one or more of the inputs to time reference calculator 408. An exemplary method for calculating title time is shown and described in connection with FIG. 6.

Time reference calculator 490 receives timing signal 401 and title time reference 409, and produces application time reference(s) 492 and page time reference(s) 494. A single application time reference 492 represents an amount of elapsed time of a particular application play duration 320 (shown and discussed in connection with FIG. 3), with reference to continuous timing signal 401. Application time reference 492 is determined when title time reference 409 indicates that the current title time falls within application presentation interval 321 of the particular application. Application time reference 492 re-sets (for example, becomes inactive or starts over) at the completion of application presentation interval 321. Application time reference 492 may also re-set in other circumstances, such as in response to user events, or when trick play occurs.

Page time reference 494 represents an amount of elapsed time of a single page play duration 332, 337 (also shown and discussed in connection with FIG. 3), with reference to continuous timing signal 401. Page time reference 494 for a particular page of an application is determined when title time reference 409 indicates that the current title time falls within an applicable page presentation interval 343. Page presentation intervals are sub-intervals of application presentation intervals 321. Page time reference(s) 494 may re-set at the completion of the applicable page presentation interval(s) 343. Page time reference 494 may also re-set in other circumstances, such as in response to user events, or when trick play occurs. It will be appreciated that media object presentation intervals 345, which may be sub-intervals of application presentation intervals 321 and/or page presentation intervals 343, are also definable.

Table 1 illustrates exemplary occurrences during play of played presentation 127 by Presentation System 100, and the effects of such occurrences on application time reference 492, page time reference 494, title time reference 409, and media time reference 455.

TABLE 1

| Occurrence | Application Time 492 | Page Time 494 | Title Time 409 | Media Time 455 |
|---|---|---|---|---|
| Movie starts | Inactive unless/until application is valid | Inactive unless/until applicable page is valid | Starts (e.g., at zero) | Starts (e.g., at zero) |
| Next clip starts | Inactive unless/until application is valid | Inactive unless/until applicable page is valid | Determined based on previous title time and elapsed clip play time | Re-sets/re-starts |
| Next title starts | Inactive unless/until application is valid | Inactive unless/until applicable page is valid | Re-sets/re-starts | Re-sets/re-starts |
| Application becomes valid | Starts | Starts when applicable page is valid | Continues/no effect | Continues/no effect |
| Trick Play | Re-sets/re-starts if applicable application is valid at the title time jumped to; otherwise becomes inactive | Re-sets/re-starts if applicable page is valid at the title time jumped to; otherwise becomes inactive | Based on jumped-to location, advances or retreats to time corresponding to elapsed play duration on presentation timeline | Advances or retreats to time corresponding to elapsed clip play time(s) of active clip(s) at the jumped-to location within the title |
| Change play speed times N | Continues/no effect | Continues/no effect | Elapses N times faster | Elapses N times faster |
| Movie pauses | Continues/no effect | Continues/no effect | Pauses | Pauses |
| Movie resumes | Continues/no effect | Continues/no effect | Resumes | Resumes |

Figure 5:
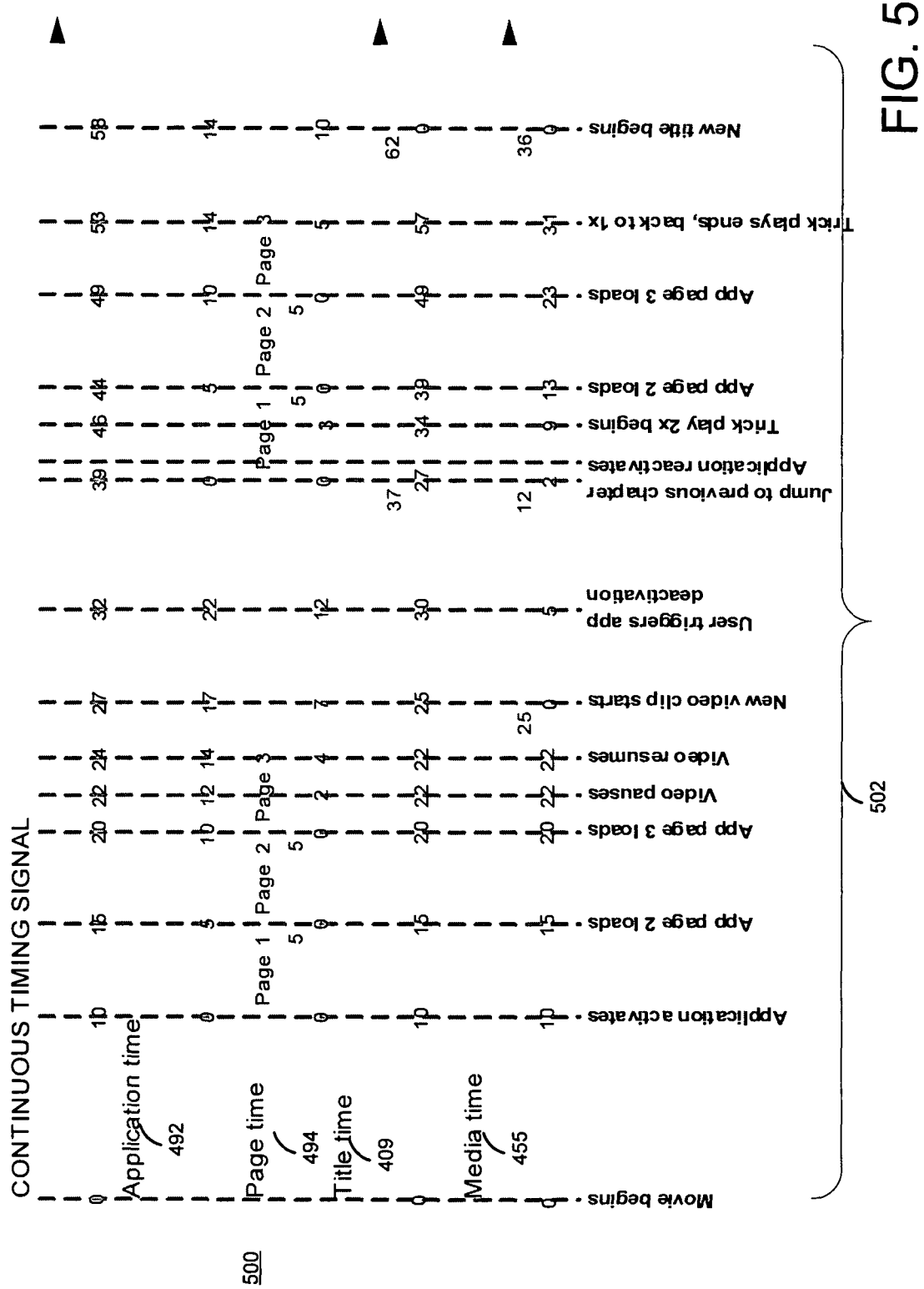
FIG. 5 is a schematic showing, with respect to a continuous timing signal, the effect of exemplary occurrences on the values of certain time references shown in FIG. 4.

FIG. 5 is a schematic, which shows in more detail the effects of certain occurrences 502 during play of played presentation 127 on application time reference 492, page time reference(s) 494, title time reference 409, and media time reference 455. Occurrences 502 and effects thereof are shown with respect to values of a continuous timing signal, such as timing signal 401. Unless otherwise indicated, a particular title of a high-definition DVD movie is playing at normal speed, and a single application having three serially-presentable pages provides user interactivity.

The movie begins playing when the timing signal has a value of zero. When the timing signal has a value of 10, the application becomes valid and activates. Application time 492, as well as page time 494 associated with page one of the application, assumes a value of zero. Pages two and three are inactive. Title time 409 and media time 455 both have values of 10.

Page two of the application loads at timing signal value 15. The application time and page one time have values of 5, while the title time and the media time have values of 15.

Page three of the application loads when the timing signal has a value of 20. The application time has a value of 10, page two time has a value of 5, and page one time is inactive. The title time and the media time have values of 20.

The movie pauses at timing signal value 22. The application time has a value of 12, page three time has a value of two, and pages one and two are inactive. The title time and media time have values of 22. The movie resumes at timing signal value 24. Then, the application time has a value of 14, page three time has a value of four, and the title time and media time have values of 22.

At timing signal value 27, a new clip starts. The application time has a value of 17, page three time has a value of 7, the title time has a value of 25, and the media time is re-set to zero.

A user de-activates the application at timing signal value 32. The application time has a value of 22, the page time has a value of 12, the title time has a value of 30, and the media time has a value of 5.

At timing signal value 39, the user jumps, backwards, to another portion of the same clip. The application is assumed to be valid at the jumped-to location, and re-activates shortly thereafter. The application time has a value of 0, page one time has a value of zero, the other pages are inactive, the title time has a value of 27, and the media time has a value of 2.

At timing signal value 46, the user changes the play speed of the movie, fast-forwarding at two times the normal speed. Fast-forwarding continues until timing signal value 53. As shown, the application and page times continue to change at a constant pace with the continuous timing signal, unaffected by the change in play speed of the movie, while the title and media times change in proportion to the play speed of the movie. It should be noted that when a particular page of the application is loaded is tied to title time 409 and/or media time 455 (see discussion of application presentation interval(s) 321 and page presentation interval(s) 343, in connection with FIG. 3).

At timing signal value 48, a new title begins, and title time 409 and media time 455 are re-set to values of zero. With respect to the initial title, this occurs when the title time has a value of 62, and the media time has a value of 36. Re-setting (not shown) of application time 492 and page time 494 follows re-setting of title time 409 and media time 455.

Having access to various timelines, clock sources, timing signals, and timing signal references enhances the ability of Presentation System 100 to achieve frame-level synchronization of IC data 124 and A/V data 132 within played presentation 127, and to maintain such frame-level synchronization during periods of user interactivity.

With continuing reference to FIGS. 1-4, FIG. 6 is a flowchart of one method for enhancing the ability of an interactive multimedia presentation system, such as Presentation System 100, to synchronously present interactive and video components of an interactive multimedia presentation, such as IC component 124 and video component 122 of Presentation Content 120/played presentation 127. The method involves using two different timing signals to measure the total elapsed play time (represented by title time 409) of at least a portion of a play duration, such as play duration 292, of the presentation.

The method begins at block 600, and continues at block 602, where a non-video time interval within the play duration of the presentation is identified. A non-video time interval is one in which video component 122 is not scheduled for presentation. Although video component 122 may not be scheduled for presentation, it will be appreciated that other video (video data associated with applications 155, for example), may be scheduled for presentation.

One way in which the non-video time interval may be identified is with reference to play duration 292 on presentation timeline 130, which is ascertained from a playlist for the presentation, such as playlist 128. Referring for exemplary purposes to FIG. 2, time interval 1 297, which is the time interval preceding the movie when the application responsible for displaying copyright notice 260 is valid, is a non-video time interval. Time interval 1 297 is defined between title time TT1 293 and TT2 294. Although an application is scheduled for presentation during time interval 1 297, it will be appreciated that it is not necessary for an application to be scheduled for presentation during a non-video time interval.

Referring again to FIG. 6, at block 604, during the non-video time interval, a first elapsed play time is measured using a continuous timing signal. The first elapsed play time is a partial elapsed play time of play duration 262. The first elapsed play time represented by title time 409 may be calculated by time reference calculator 408 using timing signal 401.

A video time interval within the play duration of the presentation is identified at block 606. A video time interval is one in which video component 122 is scheduled for presentation. It will be appreciated that video component 122 may include video, audio, data, or any combination thereof, and does not only represent visual information. In the exemplary presentation timeline 130 shown in FIG. 2, time interval 2 298 and time interval 3 299 are both video time intervals. More than one clip may be scheduled for presentation during a video time interval. When more than one clip is presentable within a particular video time interval (when both a main movie and a picture-in-picture movie are playing, for example), a particular clip is deemed to be the main clip. Generally, though not necessarily, the main movie is deemed to be the main clip. Although interactive content is also presentable during time intervals 298 and 299, interactive content need not be presentable during a video time interval.

Referring again to FIG. 6, at block 608, during the video time interval, a second elapsed play time is measured using a timing signal that is based on the play speed of the presentation. Like the first elapsed play time, the second elapsed play time is also a partial elapsed play time of play duration 262, represented by title time 409 (shown in FIG. 4). The second elapsed play time may be calculated by time reference calculator 408 using media time reference 455. Media time reference 455 is based indirectly on timing signal 471 produced by clock source 470. The manner in which media time reference 455 is based indirectly on timing signal 471 is illustrated as follows: clock source 470 adjusts the rate of timing signal 471 based on play speed input 480; clips 123 are retrieved from media sources 160 based on timing signal 471; and elapsed clip play times 452 are received by time reference calculator 454, which produces a media time reference 455 based on the elapsed clip play times 452. Alternatively, time reference calculator 408 may use timing signal 471 directly to calculate title time 409.

Figure 6:
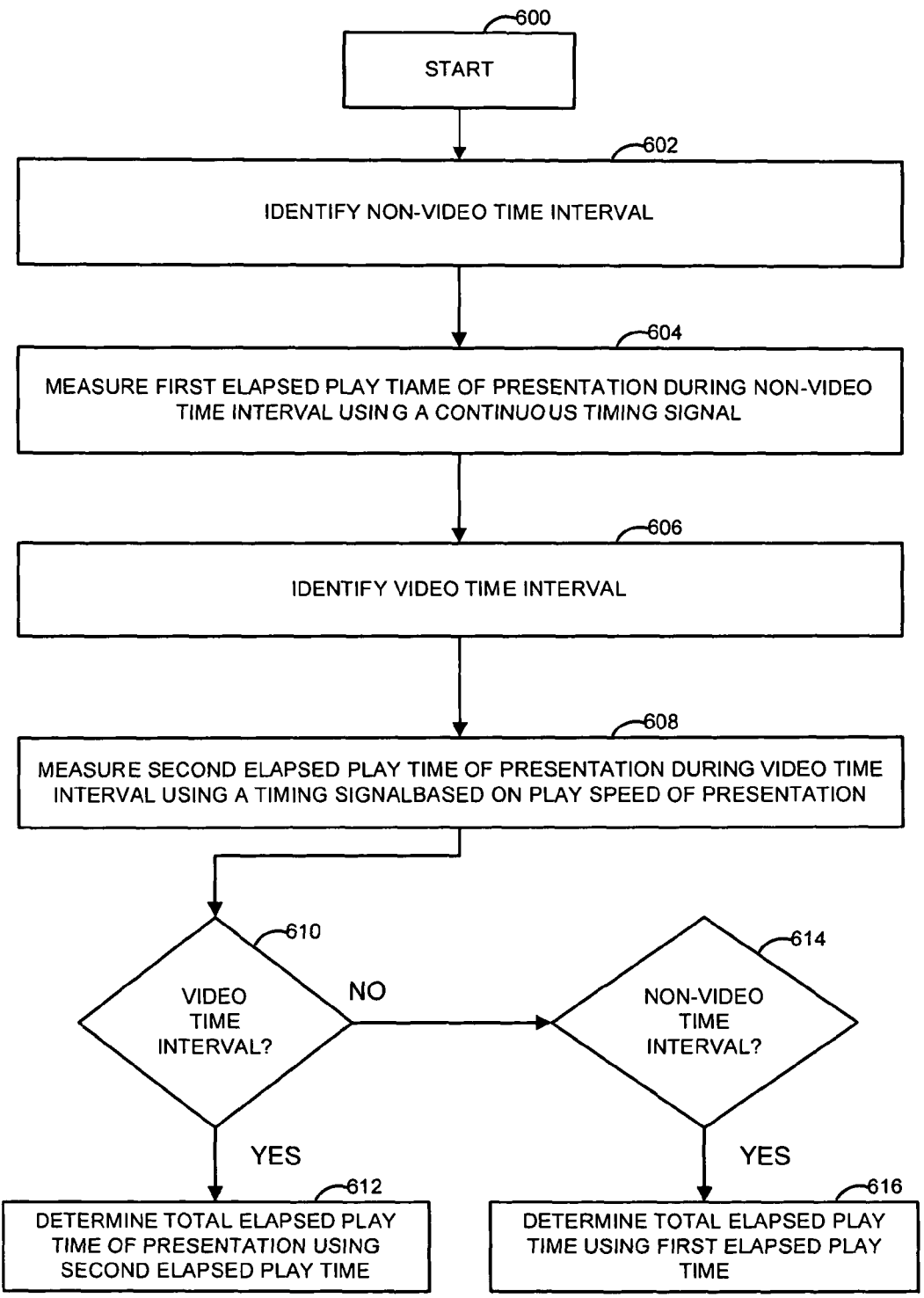
FIG. 6 is a flowchart of a method for determining a total elapsed play time of the interactive multimedia presentation shown in FIG. 1, with reference to certain time intervals illustrated in FIG. 2.

When played presentation 127 proceeds during a video time interval, as indicated at diamond 610 and subsequent box 612 of FIG. 6, the total elapsed play time, title time 409, is determined using the second elapsed play time. In this manner, the value of the total elapsed play time reflects and prioritizes what is happening during play of video component 122. If there is a problem or delay associated with reading clips 123 from media sources 160, for example, one or more elapsed clip play times 452 would pause, and title time 409 would also pause. IC component 124, which includes applications 155 having application presentation intervals 321 based on title time 409, is accordingly allowed to remain synchronized with presentation of video component 122. In the example of a moving car that is being followed by graphical overlay 290, the circle would move with the car even when there are problems or delays with reading footage of the car from media sources 160.

If, as indicated at diamond 614 and subsequent box 616, played presentation 127 proceeds during a non-video time interval, the total elapsed play time, title time 409, is determined using the first elapsed play time. Accordingly, during the non-video time interval, accurate advancement of played presentation 127 is achieved by calculating title time 409 based on a continuous timing signal, such as timing signal 401.

It is desirable to recognize the transition from one type of time interval to another at least one unit of title time 409 in advance of the transition, to facilitate accurate calculation of title time 409 based on either the play speed-based timing signal (timing signal 471 and/or media time reference 455) or the continuous timing signal (timing signal 401). For example, prior to transition from a non-video interval to a video interval, the first frame of A/V data 132 (e.g., the first frame of the main video clip) to be presented in the video interval could be prepared for rendering. Then, the first frame of A/V data 132 would be presentable at the title time when it is scheduled for presentation based on presentation timeline 130. Likewise, prior to transition from a video interval to a non-video interval, the first frame if IC data 134 could be pre-rendered.

With continuing reference to FIGS. 1-4, FIG. 7 is a flowchart of another method for enhancing the ability of an interactive multimedia presentation system, such as Presentation System 100, to synchronously present interactive and video components of an interactive multimedia presentation, such as IC component 124 and video component 122 of Presentation Content 120/played presentation 127. The method involves accessing clock sources and forming various time references.

In the context of Presentation System 100, Presentation Content 120/played presentation 127 has play duration 292. IC component 124 includes application 155 having instructions 304 for rendering one or more media objects 125. Application 155 has application play duration 320 that in the context of play duration 292 is represented by application presentation interval 321. Video component 122 includes one or more clips 123.

The method begins at block 700, and continues at block 702, where a first timing signal is produced based on the play speed of the presentation. In the context of Presentation System 100, timing signal 471 is produced by clock source 470, which adjusts the rate of timing signal 471 based on play speed input 480.

At block 704, a second timing signal is produced at a continuous predetermined rate. In the context of Presentation System 100, timing signal 401 is produced by clock source 402.

A title time reference is formed at block 706. In the context of Presentation System 100, time reference calculator 408 forms title time reference 409 by measuring an elapsed play time of play duration 292 based on timing signal 401. Title time reference 409 may be based indirectly on timing signal 471 produced by clock source 470, as discussed in connection with FIG. 6. Alternatively, title time reference 409 may be based directly on timing signal 471 or another timing signal based on play speed input 480. Media time reference 455 is input to time reference calculator 408 to form title time reference 409.

At diamond 708, it is determined whether the title time is within the application presentation interval. When the title time is not within the application presentation interval, the application is deemed inactive, at block 715. If the title time is within the application presentation interval, then the application is valid as discussed above. In the context of Presentation System 100, when title time reference 409 falls within an applicable application presentation interval 321, the associated application 155 is deemed valid.

At diamond 710, it is further determined whether application resources (for example, resources referenced by resource package data structure 340) are loaded. If necessary, resource loading is performed at block 712. In the context of Presentation System 100, prior to playing a particular application 155, such as when the application initially becomes valid, or when the application becomes valid based on a change in the play speed of the presentation (after trick play, for example), resources for application 155 are loaded into a memory, such as a file cache. Resources include media objects 125 associated with the application, as well as instructions 304 for rendering the media objects. Media objects 125 and instructions 304 for a particular application are collectively referred to as a resource package. As discussed in connection with FIG. 3, resource package data structure 340 references storage locations of elements of a particular application's resource package. Resource package data structure 340 may be embedded into video component 122 and read directly from the video component, rather than having to seek out of the video content stream to locate application resources. Alternatively, resources may be embedded directly within the video stream, or loaded from a separate application package (located on an optical medium, for example).

Figure 7:
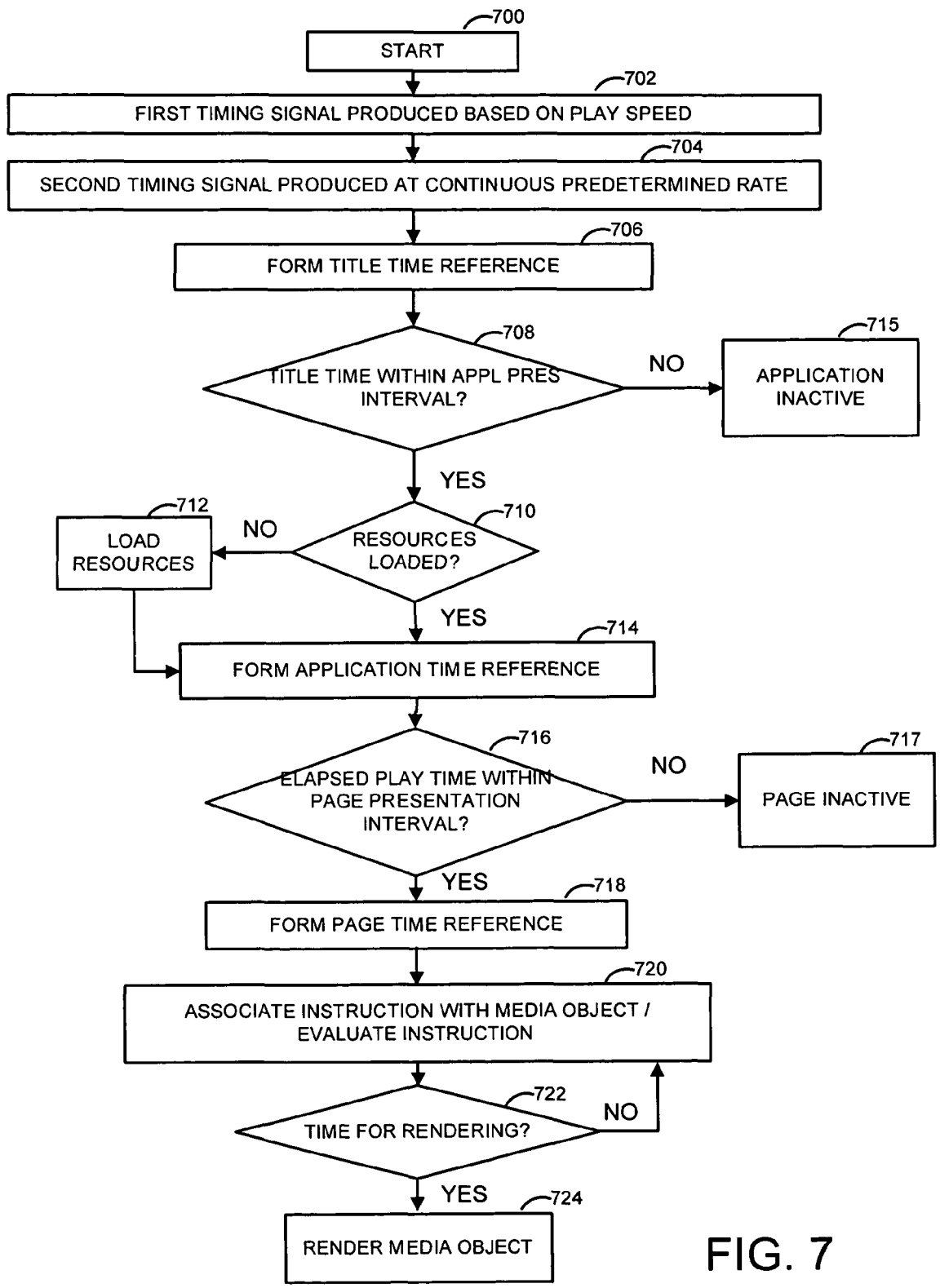
FIG. 7 is a flowchart of a method for using certain aspects of the timing signal management block shown in FIG. 4 to play an interactive multimedia presentation.

Referring again to the flowchart of FIG. 7, an application time reference is formed at block 714. The application time reference is formed by measuring an elapsed play time of the application play duration based on the second timing signal. In the context of Presentation System 100, when title time reference 409 falls within application presentation interval 321, application time reference 492 is formed. Time reference calculator 490 produces application time reference 492 based on timing signal 401. At the completion of application presentation interval 321, application time reference 492 re-sets (for example, becomes inactive or starts over). Application time reference 492 may also re-set in other circumstances, such as when trick play occurs.

At diamond 716, it is determined whether the current elapsed play time is within an applicable page presentation interval, and if so, a page time reference is formed at block 718. The page time reference is formed by measuring an elapsed play time of the applicable page play duration 332, 337 based on the second timing signal (timing signal 401). If the current elapsed play time is not within an applicable page presentation interval, the applicable page is deemed inactive, at block 717. In the context of Presentation System 100, when title time reference 409 falls within an applicable page presentation interval 343, page time reference 494 is formed.

Application and page time references may re-set when application presentation intervals end, or in other circumstances, such as in response to user events or play speed inputs 480. For example, after trick play, assuming title time 409 is within application presentation interval 321, application (and page time references, as applicable) may re-start (at zero or another starting value).

At block 720, an instruction is associated with a media object. In the context of Presentation System 100, one type of instruction is instruction 304 associated with application 155. Instruction 304 represents one or more declarative language data structures, such as XML markup elements 302, 306, 310, 312, 360 or attributes thereof, used alone or in combination with script 308, to reference states of one or more clocks or timing signals for the purpose of establishing times at, or time durations within, which media object(s) 125 are rendered. Markup elements within content containers, timing containers, or style containers may refer to, or have one or more attributes that refer to, timing signal 401 or timing signal 471.

Elements and attributes thereof can refer to timing signal 401 and/or timing signal 407 directly or indirectly. For example, timing signal 401 may be referred to indirectly via clock source 402, IC frame rate calculator 404, A/V frame rate calculator 406, application time 492, or page time 494. Likewise, timing signal 407 may be referred to indirectly via clock source 470, elapsed clip play time(s) 452, time reference calculator 454, media time reference 455, time reference calculator 408, or title time reference 409, for example.

In one example, one or more attributes may be defined in special-purpose XML schemas, such as XML schemas for use with certain high-definition DVD movies. One example of such an attribute is referred to herein as a "clock attribute," which is defined by one or more XML schemas promulgated by the DVD Forum for use with XML documents in compliance with the DVD Specifications for High Definition Video. The clock attribute is usable with various elements in content, timing, or style containers to refer directly or indirectly to timing signal 401 or timing signal 471. In another example, the par, timing, or seq elements within a time container may refer to, or may have one or more attributes that refer to, timing signal 401 or timing signal 471. In this manner, markup elements within timing containers of XML documents may be used to define media object presentation intervals 345 with reference to both page time and title time. In yet another example, timer elements may also be defined that can be used by an application to be notified when some specific duration has elapsed. In a further example, user events and other types of events may be defined by times linked to different time scales. Times, or time intervals, for which a particular event is valid may be established by referring to timing signal 401 or timing signal 471.

Expressions involving logical references to clocks, timing signals, time reference calculators, and/or time references may also be used to define conditions for presenting media objects 125 using elements or attributes of elements in XML documents. For example, Boolean operands such as "AND," "OR," and "NOT", along with other operands or types thereof, may be used to define such expressions or conditions.

As indicated at diamond 722 and block 724, the media object is rendered when, based on the instruction, the time for rendering the media object is reached. It will be appreciated that a media object is not always rendered, because user input may dictate whether and when the media object is rendered.

In the context of Presentation System 100, during execution of a particular application 155, a document object model ("DOM") tree (not shown) associated with the application maintains the context for the state of the markup elements, and a script host (not shown) associated with the application maintains the context for the script's variables, functions, and other states. As execution of application instructions 304 progresses and user input is received, the properties of any affected elements are recorded and may be used to trigger behavior of media objects 125 within played presentation 127. It can be seen that synchronization between interactive and video components of Presentation Content 120/played presentation 127 is achieved based on one or more clocks outside of the DOM, rather than clocks associated with the DOM.

Work items (not shown) resulting from execution of instructions 304 are placed in queue(s) (not shown), and are performed at a rate provided by IC frame rate 405. IC data 134 resulting from performance of work items is transmitted to renderer/mixer 110. Mixer/renderer 110 renders IC data 134 in the graphics plane to produce the interactive portion of played presentation 127 for the user.

The processes illustrated in FIGS. 6 and 7 may be implemented in one or more general, multi-purpose, or single-purpose processors, such as processor 802 discussed below, in connection with FIG. 8. Unless specifically stated, the methods described herein are not constrained to a particular order or sequence. In addition, some of the described method or elements thereof can occur or be performed concurrently.

Figure 8:
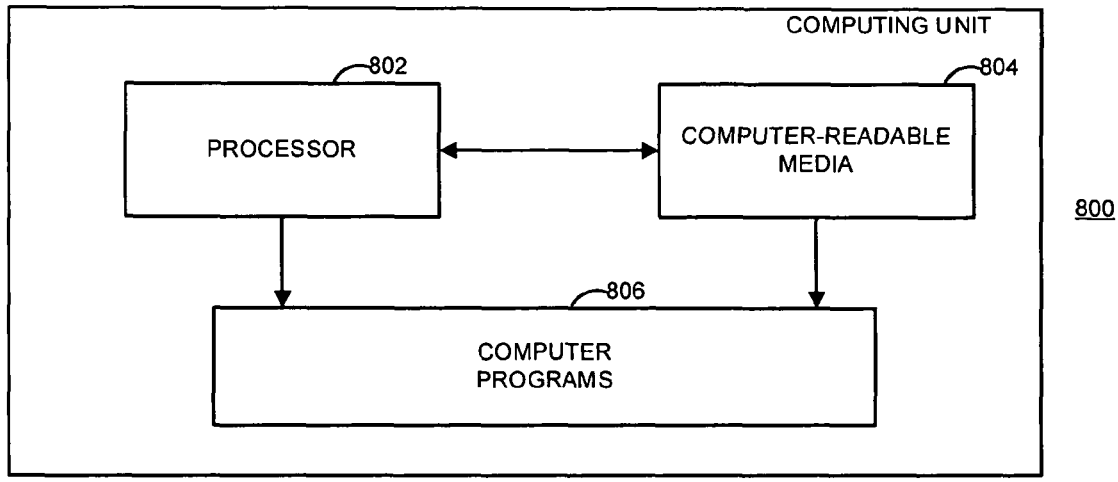
FIG. 8 is a simplified functional block diagram of a general-purpose computing unit usable in connection with aspects of the interactive multimedia presentation system shown in FIG. 1.

FIG. 8 is a block diagram of a general-purpose computing unit 800, illustrating certain functional components that may be used to implement, may be accessed by, or may be included in, various functional components of Presentation System 100. One or more components of computing unit 800 may be used to implement, be accessible by, or be included in, IC manager 104, presentation manager 106, and AVC manager 102. For example, one or more components of FIG. 8 may be packaged together or separately to implement functions of Presentation System 100 (in whole or in part) in a variety of ways.

A processor 802 is responsive to computer-readable media 804 and to computer programs 806. Processor 802, which may be a real or a virtual processor, controls functions of an electronic device by executing computer-executable instructions. Processor 802 may execute instructions at the assembly, compiled, or machine-level to perform a particular process. Such instructions may be created using source code or any other known computer program design tool.

Computer-readable media 804 represent any number and combination of local or remote devices, in any form, now known or later developed, capable of recording, storing, or transmitting computer-readable data, such as the instructions executable by processor 802. In particular, computer-readable media 804 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 804 may also include transmission media and data associated therewith. Examples of transmission media/data include, but are not limited to, data embodied in any form of wireline or wireless transmission, such as packetized or non-packetized data carried by a modulated carrier signal.

Computer programs 806 represent any signal processing methods or stored instructions that electronically control predetermined operations on data. In general, computer programs 806 are computer-executable instructions implemented as software components according to well-known practices for component-based software development, and encoded in computer-readable media (such as computer-readable media 804). Computer programs may be combined or distributed in various ways.

Functions/components described in the context of Presentation System 100 are not limited to implementation by any specific embodiments of computer programs. Rather, functions are processes that convey or transform data, and may generally be implemented by, or executed in, hardware, software, firmware, or any combination thereof, located at, or accessed by, any combination of functional elements of Presentation System 100.

Figure 9:
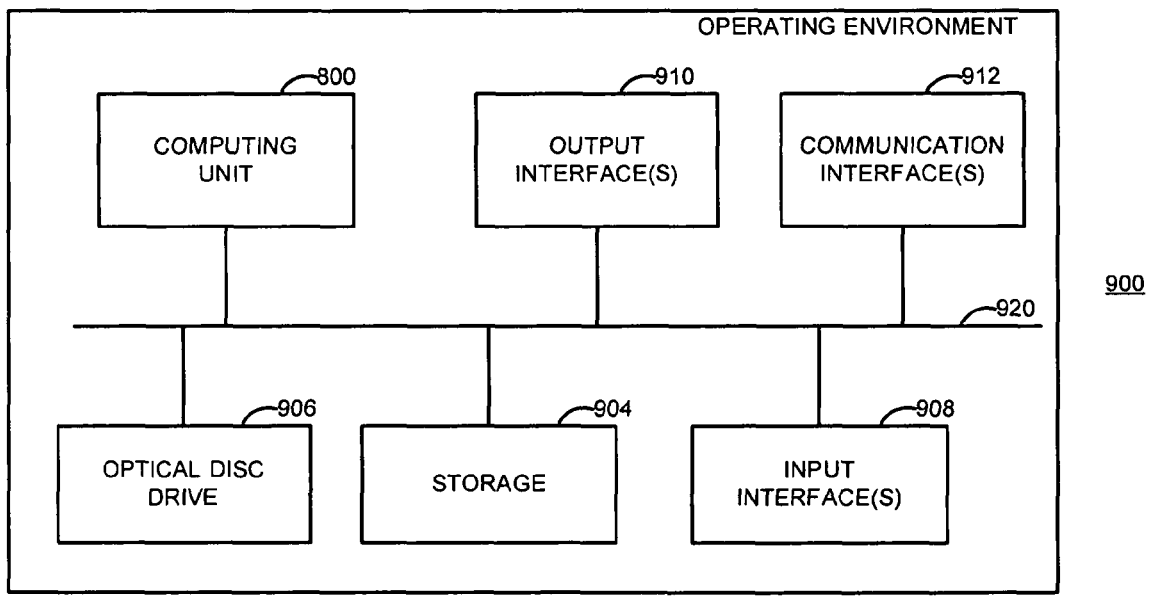
FIG. 9 is a simplified function block diagram of an exemplary configuration of an operating environment in which the interactive multimedia presentation system shown in FIG. 1 may be implemented or used.

With continued reference to FIG. 8, FIG. 9 is a block diagram of an exemplary configuration of an operating environment 900 in which all or part of Presentation System 100 may be implemented or used. Operating environment 900 is generally indicative of a wide variety of general-purpose or special-purpose computing environments. Operating environment 900 is only one example of a suitable operating environment and is not intended to suggest any limitation as to the scope of use or functionality of the system(s) and methods described herein. For example, operating environment 900 may be a type of computer, such as a personal computer, a workstation, a server, a portable device, a laptop, a tablet, or any other type of electronic device, such as an optical media player or another type of media player, now known or later developed, or any aspect thereof. Operating environment 900 may also be a distributed computing network or a Web service, for example. A specific example of operating environment 900 is an environment, such as a DVD player or an operating system associated therewith, which facilitates playing high-definition DVD movies.

As shown, operating environment 900 includes or accesses components of computing unit 800, including processor 802, computer-readable media 804, and computer programs 806. Storage 904 includes additional or different computer-readable media associated specifically with operating environment 900, such as an optical disc, which is handled by optical disc drive 906. One or more internal buses 920, which are well-known and widely available elements, may be used to carry data, addresses, control signals and other information within, to, or from computing environment 900 or elements thereof.

Input interface(s) 908 provide input to computing environment 900. Input may be collected using any type of now known or later-developed interface, such as a user interface. User interfaces may be touch-input devices such as remote controls, displays, mice, pens, styluses, trackballs, keyboards, microphones, scanning devices, and all types of devices that are used input data.

Output interface(s) 910 provide output from computing environment 900. Examples of output interface(s) 910 include displays, printers, speakers, drives (such as optical disc drive 906 and other disc drives), and the like.

External communication interface(s) 912 are available to enhance the ability of computing environment 900 to receive information from, or to transmit information to, another entity via a communication medium such as a channel signal, a data signal, or a computer-readable medium. External communication interface(s) 912 may be, or may include, elements such as cable modems, data terminal equipment, media players, data storage devices, personal digital assistants, or any other device or component/combination thereof, along with associated network support devices and/or software or interfaces.

Figure 10:
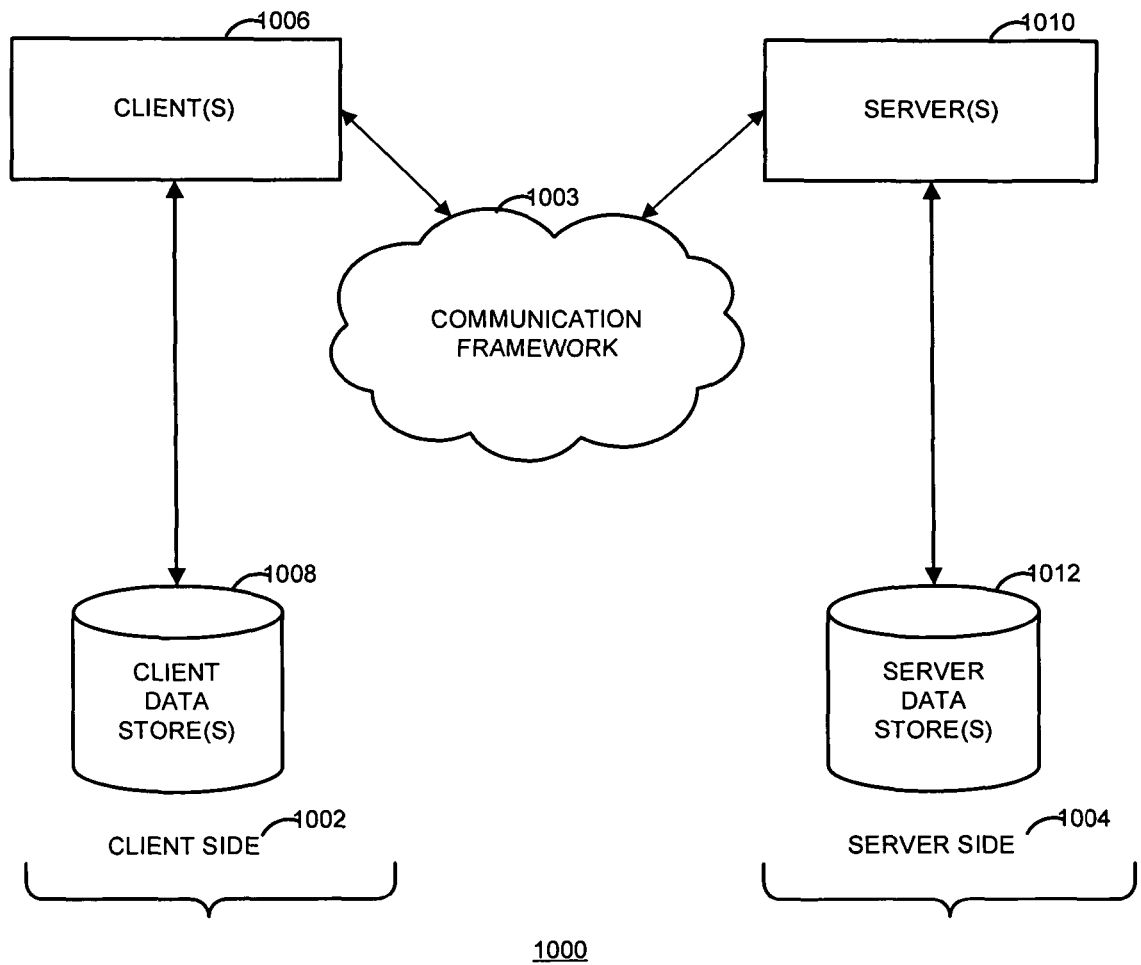
FIG. 10 is a simplified functional diagram of a client-server architecture in which the interactive multimedia presentation system shown in FIG. 1 may be implemented or used.

FIG. 10 is a simplified functional diagram of a client-server architecture 1000 in connection with which the Presentation System 100 or operating environment 1000 may be used. One or more aspects of Presentation System 100 and/or operating environment 900may be represented on a client-side 1002 of architecture 1000 or on a server-side 1004 of architecture 1000. As shown, communication framework 1303 (which may be any public or private network of any type, for example, wired or wireless) facilitates communication between client-side 1002 and server-side 1004.

On client-side 1002, one or more clients 1006, which may be implemented in hardware, software, firmware, or any combination thereof, are responsive to client data stores 1008. Client data stores 1008 may be computer-readable media 804, employed to store information local to clients 1006. On server-side 1004, one or more servers 1010 are responsive to server data stores 1012. Like client data stores 1008, server data stores 1012 may be computer-readable media 804, employed to store information local to servers 1010.

Various aspects of an interactive multimedia presentation system that is used to present interactive content to a user synchronously with audio/video content have been described. An interactive multimedia presentation has been generally described as having a play duration, a variable play speed, a video component, and an IC component. It will be understood, however, that all of the foregoing components need not be used, nor must the components, when used, be present concurrently. Functions/components described in the context of Presentation System 100 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. An apparatus for playing an interactive multimedia presentation including audio/video content and interactive content, comprising:
   one or more real processors; and
   memory storing computer-readable data including instructions executable by the one or more real processors to implement
      an audio/video content manager configured for producing frames of audio/video content that are renderable as part of the interactive multimedia presentation, the audio/video content being renderable at a play speed that is selectable according to user input, the play speed being variable between intervals of normal playback of the audio/video content and trick play of the audio/video content,
      an interactive content manager configured for producing frames of interactive content that are renderable as part of the interactive multimedia presentation, the interactive content including media objects being generated by one or more applications,
      a timing signal management block configured for generating a play speed-based timing signal and a continuous timing signal,
      the play speed-based timing signal having a variable rate based on the play speed and being utilized for determining an audio/video frame rate at which the frames of audio/video content are produced and rendered,
      the continuous timing signal having a constant rate which is invariant with respect to the play speed, and being utilized for determining an interactive content frame rate at which the frames of interactive content are produced and rendered, and
      a presentation manager in communication with the audio/video content manager, interactive content manager, and timing signal management block, and being configured for determining a presentation timeline identifying times for which clips of audio/video content are presentable to one or more users of the apparatus, the times being identified using a timeline that is based on the play speed-based timing signal, in which the presentation timeline includes one of a title timeline or a media timeline, each of the title and media timelines being paused or resumed as the video content is paused or resumed, and time T on each of the title and media timelines elapsing at N×T as the play speed of the video content changes by a factor of N, the title timeline providing a total elapsed play time for all clips of audio/video content and the media timeline providing a total elapsed play time for a given clip of audio/video content.

2. The apparatus of claim 1 in which the presentation manager is configured for determining a presentation timeline identifying times for which media objects generated by the one or more applications are presentable to one or more users of the apparatus, the times being identified using a timeline that is based on the continuous timing signal.

3. The apparatus of claimed 2 in which the psresentation timeline includes one of an application timeline or page timeline, each of the application and page timelines continuing irrespective of pausing and resuming of the video content, trick play, or changes in the video content play speed, the application timeline providing a play duration for an application and the page timeline providing a play duration for a page of the application.

4. The apparatus of claim 1 further comprising
   a mixer/renderer configured for rendering frames of interactive into a graphics plane that is overlaid on a video plane into which video content frames are rendered so that the media objects are rendered synchronously with the audio/video content.

5. A method for playing an interactive multimedia presentation including audio/video content and interactive content, the method comprising:
   producing frames of audio/video content that are renderable as part of the interactive multimedia presentation, the audio/video content being renderable at a play speed that is selectable according to user input, the play speed being variable between intervals of normal playback of the audio/video content and trick play of the audio/video content;
   producing frames of interactive content that are renderable as part of the interactive multimedia presentation, the interactive content including media objects being generated by one or more applications;
   generating a play speed-based timing signal and a continuous timing signal, the play speed-based timing signal having a variable rate based on the play speed and being utilized for determining an audio/video frame rate at which the frames of audio/video content are produced and rendered, the continuous timing signal having a constant rate which is invariant with respect to the play speed, and being utilized for determining an interactive content frame rate at which the frames of interactive content are produced and rendered; and determining a presentation timeline identifying times for which clips of audio/video content are presentable to one or more users, the times being identified using a timeline that is based on the play speed-based timing signal, in which the presentation timeline includes one of a title timeline or a media timeline, each of the title and media timelines being paused or resumed as the video content is paused or resumed, and time T on each of the title and media timelines elapsing at N×T as the play speed of the video content changes by a factor of N, the title timeline providing a total elapsed play time for all clips of audio/video content and the media timeline providing a total elapsed play time for a given clip of audio/video content.

6. The method of claim 5 further comprising determining a presentation timeline identifying times for which media objects generated by the one or more applications are presentable to one or more users, the times being identified using a timeline that is based on the continuous timing signal.

7. The method of claim 6 in which the presentation timeline includes one of an application timeline or page timeline, each of the application and page timelines continuing irrespective of pausing and resuming of the video content, trick play, or changes in the video content play speed, the application timeline providing a play duration for an application and the page timeline providing a play duration for a page of the application.

8. The method of claim 5 further comprising rendering frames of interactive content into a graphics plane that is overlaid on a video plane into which video content frames are rendered so that the media objects are rendered synchronously with the audio/video content.

9. A memory storing computer-readable data including instructions which, when executed by one or more real processors, implement:
    an audio/video content manager configured for producing frames of audio/video content that are renderable as part of the interactive multimedia presentation, the audio/video content being renderable at a play speed that is selectable according to user input, the play speed being variable between intervals of normal playback of the audio/video content and trick play of the audio/video content,
    an interactive content manager configured for producing frames of interactive content that are renderable as part of the interactive multimedia presentation, the interactive content including media objects being generated by one or more applications,
    a timing signal management block configured for generating a play speed-based timing signal and a continuous timing signal,
    the play speed-based timing signal having a variable rate based on the play speed and being utilized for determining an audio/video frame rate at which the frames of audio/video content are produced and rendered,
    the continuous timing signal having a constant rate which is invariant with respect to the play speed, and being utilized for determining an interactive content frame rate at which the frames of interactive content are produced and rendered, and
    a presentation manager in communication with the audio/video content manager, interactive content manager, and timing signal management block, and being configured for determining a presentation timeline identifying times for which clips of audio/video content are presentable to one or more users, the times being identified using a timeline that is based on the play speed-based timing signal, in which the presentation timeline includes one of a title timeline or a media timeline, each of the title and media timelines being paused or resumed as the video content is paused or resumed, and time T on each of the title and media timelines elapsing at N×T as the play speed of the video content changes by a factor of N, the title timeline providing a total elapsed play time for all clips of audio/video content and the media timeline providing a total elapsed play time for a given clip of audio/video content.

10. The memory of claim 9 in which the presentation manager is configured for determining a presentation timeline identifying times for which media objects generated by the one or more applications are presentable to one or more users, the times being identified using a timeline that is based on the continuous timing signal.

11. The memory of claim 10 in which the presentation timeline includes one of an application timeline or page timeline, each of the application and page timelines continuing irrespective of pausing and resuming of the video content, trick play, or changes in the video content play speed, the application timeline providing a play duration for an application and the page timeline providing a play duration for a page of the application.

12. The memory of claim 9 further comprising
    a mixer/renderer configured for rendering frames of interactive content into a graphics plane that is overlaid on a video plane into which video content frames are rendered so that the media objects are rendered synchronously with the audio/video content.

* * * * *